United States Patent
Phillips et al.

(10) Patent No.: US 9,845,912 B2
(45) Date of Patent: Dec. 19, 2017

(54) GANG CHARGER, SHROUD, AND DOCK FOR PORTABLE ELECTRONIC DEVICES

(71) Applicant: InVue Security Products Inc., Charlotte, NC (US)

(72) Inventors: Jonathan D. Phillips, Fort Mill, SC (US); Larry T. McKinney, Huntersville, NC (US); Erik L. van Bergen, Waxhaw, NC (US); Antonios L. Karagiannis, Charlotte, NC (US); Mark D. Reeves, Fort Mill, SC (US); Matthew Thomas Kerley, Fort Mill, SC (US); John A. Buchanan, Indian Land, SC (US); Daniel C. Symons, Waxhaw, NC (US); Darin J. Shaw, Waxhaw, NC (US); Joshua Abdollahzadeh, Denver, NC (US); Scott M. Speck, Indian Trail, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

(21) Appl. No.: 15/510,929

(22) PCT Filed: Sep. 29, 2016

(86) PCT No.: PCT/US2016/054412
§ 371 (c)(1),
(2) Date: Mar. 13, 2017

(87) PCT Pub. No.: WO2017/059052
PCT Pub. Date: Apr. 6, 2017

(65) Prior Publication Data
US 2017/0276289 A1  Sep. 28, 2017

Related U.S. Application Data

(60) Provisional application No. 62/234,730, filed on Sep. 30, 2015, provisional application No. 62/278,786, filed on Jan. 14, 2016.

(51) Int. Cl.
*G08B 13/14* (2006.01)
*F16M 11/04* (2006.01)
(Continued)

(52) U.S. Cl.
CPC .......... *F16M 11/04* (2013.01); *G06F 1/1607* (2013.01); *G06F 1/1635* (2013.01); *G06F 21/84* (2013.01);
(Continued)

(58) Field of Classification Search
CPC ....... G06F 1/1607; F16M 11/04; E05B 65/00; E05B 65/0894; H05K 5/0221;
(Continued)

(56) References Cited

U.S. PATENT DOCUMENTS

| 4,066,231 A | 1/1978 | Bahner et al. |
| 4,547,027 A | 10/1985 | Scheibenreif |

(Continued)

FOREIGN PATENT DOCUMENTS

| CN | 101360660 A1 | 2/2009 |
| CN | 101583983 A1 | 11/2009 |

(Continued)

OTHER PUBLICATIONS

"HP Retail Case Data Sheet"; Hewlett-Packard Development Company, L.P.; Jan. 2015; 2 pages.
(Continued)

*Primary Examiner* — George Bugg
*Assistant Examiner* — Anthony D Afrifa-Kyei
(74) *Attorney, Agent, or Firm* — InVue Security Products Inc.

(57) ABSTRACT

An anti-theft device for protecting a portable electronic device from theft or unauthorized removal in a retail environment is provided. The anti-theft device includes a shroud configured to at least partially receive and engage a portable
(Continued)

electronic device. The anti-theft device also includes a dock configured to releasably engage the shroud. The dock is configured to engage the shroud in a locked configuration so as to prevent removal of the shroud and the portable electronic device from the dock and to disengage the shroud in an unlocked configuration so as to allow the shroud and the portable electronic device to be removed from the dock.

53 Claims, 16 Drawing Sheets

(51) Int. Cl.
| | | |
|---|---|---|
| G06F 1/16 | (2006.01) | |
| G06F 21/84 | (2013.01) | |
| G06F 21/87 | (2013.01) | |
| H05K 7/18 | (2006.01) | |
| H02B 1/01 | (2006.01) | |
| H05K 5/03 | (2006.01) | |
| H05K 5/02 | (2006.01) | |
| E05B 47/00 | (2006.01) | |
| E05B 65/00 | (2006.01) | |

(52) U.S. Cl.
CPC .......... *G06F 21/87* (2013.01); *G08B 13/149* (2013.01); *H02B 1/01* (2013.01); *H05K 5/03* (2013.01); *H05K 7/18* (2013.01); *E05B 47/00* (2013.01); *E05B 65/00* (2013.01); *H05K 5/02* (2013.01)

(58) Field of Classification Search
CPC . G08B 13/1445; G08B 13/1409; A47F 7/024; G06C 30/00
USPC ...................................................... 340/568.1
See application file for complete search history.

(56) References Cited

U.S. PATENT DOCUMENTS

| | | | |
|---|---|---|---|
| 4,831,368 A | 5/1989 | Masimo et al. | |
| 5,667,179 A | 9/1997 | Rosen | |
| 5,708,561 A | 1/1998 | Huilgol et al. | |
| 5,751,548 A | 5/1998 | Hall et al. | |
| 5,878,211 A | 3/1999 | Delagrange et al. | |
| 6,007,038 A | 12/1999 | Han | |
| 6,061,104 A | 5/2000 | Evanicky et al. | |
| 6,105,919 A | 8/2000 | Min | |
| 6,189,850 B1 | 2/2001 | Liao et al. | |
| 6,282,082 B1 | 8/2001 | Armitage et al. | |
| 6,437,975 B1 | 8/2002 | Huang | |
| 6,443,408 B1 | 9/2002 | Hung | |
| 6,554,238 B1 | 4/2003 | Hibberd | |
| 6,856,506 B2 | 2/2005 | Doherty et al. | |
| 6,863,252 B2 | 3/2005 | Bosson | |
| 6,874,744 B2 | 4/2005 | Rawlings et al. | |
| 6,912,122 B2 | 6/2005 | Chen et al. | |
| 6,963,487 B2 | 11/2005 | Billington et al. | |
| 6,987,666 B2 | 1/2006 | Medica et al. | |
| 7,052,296 B2 | 5/2006 | Yang et al. | |
| 7,236,354 B2 | 6/2007 | Hsu et al. | |
| 7,331,551 B2 | 2/2008 | Oddsen, Jr. | |
| 7,352,567 B2 | 4/2008 | Hotelling et al. | |
| 7,445,300 B2 | 11/2008 | Collins et al. | |
| 7,503,538 B2 | 3/2009 | Liou et al. | |
| 7,542,052 B2 | 6/2009 | Solomon et al. | |
| 7,694,922 B2 | 4/2010 | Kim | |
| 7,715,187 B2 | 5/2010 | Hotelling et al. | |
| 7,740,214 B2 | 6/2010 | Marsilio et al. | |
| 7,800,914 B2 | 9/2010 | Dully | |
| 7,804,682 B2 | 9/2010 | Tseng | |
| 7,916,467 B2 | 3/2011 | Hotelling et al. | |
| 7,916,468 B2 | 3/2011 | Takizawa | |
| 7,993,414 B2 | 8/2011 | Jeansonne et al. | |
| 8,418,514 B1 | 4/2013 | Su | |
| 8,553,408 B2 | 10/2013 | Supran et al. | |
| 8,602,304 B2* | 12/2013 | Cohen | G06Q 20/3226 235/449 |
| 8,611,076 B2 | 12/2013 | Wetzel et al. | |
| 8,711,553 B2 | 4/2014 | Trinh et al. | |
| 8,749,963 B2 | 6/2014 | Staats et al. | |
| 8,780,548 B2 | 7/2014 | Lee | |
| 8,794,579 B2 | 8/2014 | Sturman et al. | |
| 8,800,763 B2 | 8/2014 | Hale | |
| 8,851,565 B2 | 10/2014 | Hontz et al. | |
| 8,917,496 B2 | 12/2014 | Richardson et al. | |
| 8,979,040 B2 | 3/2015 | Chein et al. | |
| 9,019,698 B2 | 4/2015 | Thiers | |
| 9,030,828 B2 | 5/2015 | Lindblad et al. | |
| 9,141,145 B2 | 9/2015 | White et al. | |
| 9,163,433 B2 | 10/2015 | Sedon | |
| 9,220,358 B2 | 12/2015 | Wheeler et al. | |
| 9,256,249 B2 | 2/2016 | Truong et al. | |
| 9,261,901 B2 | 2/2016 | Truong | |
| 9,296,340 B2 | 3/2016 | Ackeret et al. | |
| 2003/0222848 A1 | 12/2003 | Solomon et al. | |
| 2005/0207110 A1 | 9/2005 | Wang et al. | |
| 2006/0066438 A1 | 3/2006 | Altounian et al. | |
| 2007/0014082 A1 | 1/2007 | Wang et al. | |
| 2008/0012536 A1 | 1/2008 | Glass | |
| 2008/0209965 A1 | 9/2008 | Maack | |
| 2008/0259551 A1 | 10/2008 | Gavenda et al. | |
| 2008/0298782 A1 | 12/2008 | Lee | |
| 2009/0079566 A1 | 3/2009 | Goldstein et al. | |
| 2009/0158423 A1 | 6/2009 | Orlassino et al. | |
| 2009/0293120 A1 | 11/2009 | Feng et al. | |
| 2010/0008028 A1 | 1/2010 | Richardson et al. | |
| 2010/0060410 A1 | 3/2010 | Wirth | |
| 2011/0080137 A1 | 4/2011 | Avganim | |
| 2011/0187531 A1 | 4/2011 | Oehl et al. | |
| 2011/0287808 A1 | 11/2011 | Huang | |
| 2012/0026684 A1 | 2/2012 | Matthews | |
| 2012/0033375 A1 | 2/2012 | Madonna et al. | |
| 2012/0061542 A1 | 3/2012 | Bostater | |
| 2012/0118770 A1 | 5/2012 | Valls et al. | |
| 2012/0170194 A1 | 7/2012 | Lord et al. | |
| 2012/0175474 A1 | 7/2012 | Barnard et al. | |
| 2012/0182680 A1 | 7/2012 | Wetzel et al. | |
| 2012/0188689 A1 | 7/2012 | Leung | |
| 2012/0234055 A1 | 9/2012 | Bland, III et al. | |
| 2012/0262120 A1 | 10/2012 | Dresser, III | |
| 2012/0280810 A1 | 11/2012 | Wheeler | |
| 2013/0013490 A1* | 1/2013 | Keller | G06Q 20/3226 705/39 |
| 2013/0026322 A1 | 1/2013 | Wheeler et al. | |
| 2013/0044409 A1 | 2/2013 | Pegg | |
| 2013/0107449 A1 | 5/2013 | Su et al. | |
| 2013/0109253 A1 | 5/2013 | Gammon et al. | |
| 2014/0013810 A1 | 1/2014 | Brobst et al. | |
| 2014/0075075 A1* | 3/2014 | Morrill | G06F 1/1632 710/303 |
| 2014/0118930 A1 | 5/2014 | Sedon | |
| 2014/0168884 A1 | 6/2014 | Wylie | |
| 2014/0204529 A1 | 7/2014 | White et al. | |
| 2014/0347000 A1 | 11/2014 | Hamann et al. | |
| 2014/0362517 A1 | 12/2014 | Maack et al. | |
| 2014/0366164 A1 | 12/2014 | Hoefgen et al. | |
| 2015/0186685 A1* | 7/2015 | Vroom | G06F 1/1632 726/35 |
| 2015/0205330 A1 | 7/2015 | Zhang et al. | |
| 2016/0072327 A1* | 3/2016 | Knutson | G06F 1/1632 320/108 |
| 2016/0335859 A1* | 11/2016 | Sankey | G06Q 30/00 |

FOREIGN PATENT DOCUMENTS

| | | |
|---|---|---|
| CN | 102037201 A1 | 4/2011 |
| CN | 202035834 U | 11/2011 |
| CN | 102415744 A | 4/2012 |
| JP | 2005139885 | 6/2005 |
| JP | 3168597 | 6/2011 |
| WO | 2007075739 A2 | 7/2007 |

(56) References Cited

FOREIGN PATENT DOCUMENTS

| WO | 2009116039 A1 | 9/2009 |
| WO | 2012016158 A2 | 2/2012 |
| WO | 2012051527 A1 | 4/2012 |

OTHER PUBLICATIONS

"AMagic Mobile Power Bank Expert for iPhone, iPad, Android Smartphones, Tablets"; aMagic Hong Kong; Oct. 1, 2015; 25 pages.

International Search Report and Written Opinion from corresponding International Appl. No. PCT/US2016/054412, dated Jan. 27, 2017; 15 pages.

Armoractive, [iPad] enclosures; see website at www.ipadenclosures.com; retrieved Oct. 9, 2013; 5 pages; Salt Lake City, Utah, USA.

David Everson, "Mobile Technologies Inc, and the Enterprise Tablet Pro", Mobile Technologies Inc., Aug. 15, 2013, pp. 1-2.

"Freedom Axis", Mobile Technologies Inc., retrieved Oct. 8, 2013, 6 pages.

Dell™ P2412H/P2412H-HF Monitor User Guide. <http://www.mcmelectronics.com/content/ProductData/Manuals/58-17150.pdf>. Jun. 2011 (56 pages).

Sheerin, Peter K. "Tablet PCs: A new paradigm for CAD." Apr. 2003 (8 pages).

HP Compaq LA1956x, LA2006x, LA2206x, and LA2306x LED Backlit LCD Monitors User Guide. <https://static.bhphotovideo.com/lit_files/94812.pdf>. Jun. 2012 (33 pages).

\* cited by examiner

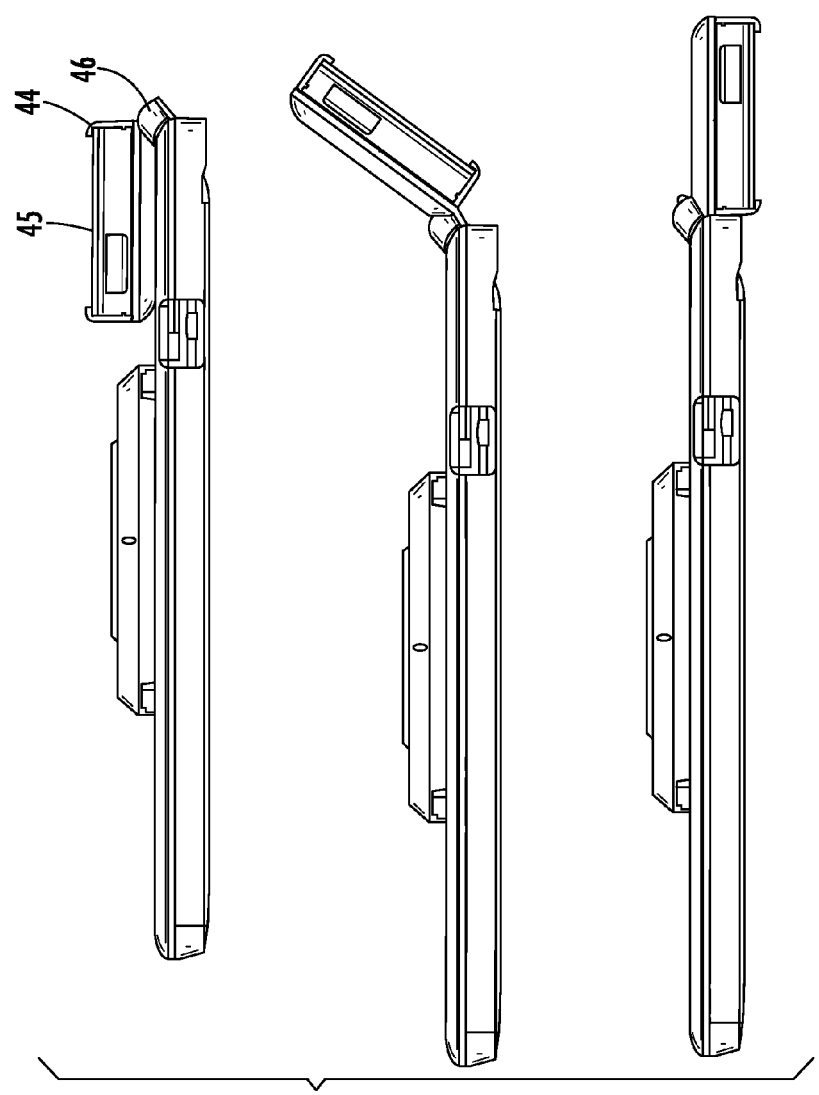
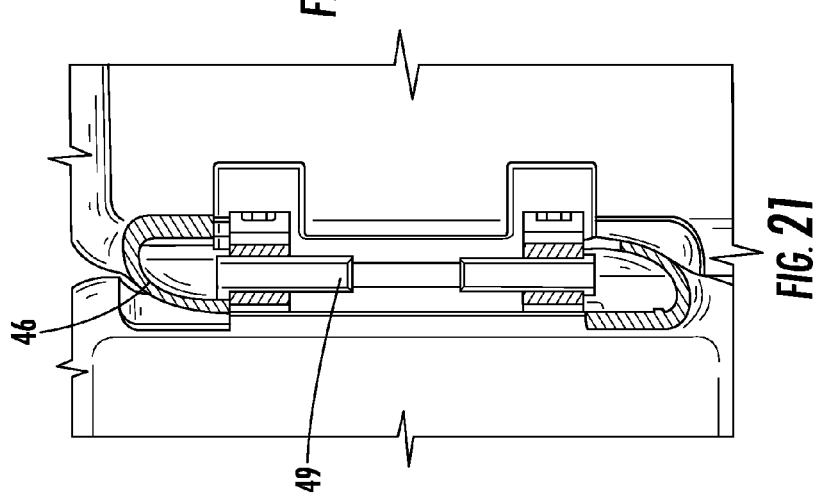

GANG CHARGER, SHROUD, AND DOCK FOR PORTABLE ELECTRONIC DEVICES

CROSS REFERENCE TO RELATED APPLICATIONS

This application is a national phase entry of International Application No. PCT/US2016/054412, filed Sep. 29, 2016, which claims the benefit to priority of U.S. Provisional Patent Application No. 62/234,730 filed on Sep. 30, 2015, and U.S. Provisional Patent Application No. 62/278,786 filed on Jan. 14, 2016, the entire disclosures of which are incorporated herein by reference.

FIELD OF THE INVENTION

Embodiments of the present invention relate generally to anti-theft devices, systems, gang chargers, docks, shrouds, and methods for protecting portable electronic devices from theft.

BACKGROUND OF THE INVENTION

A recent trend in work and retail store environments is to use smart devices, sometimes cellphones, but more often tablets, as customer service devices. This usage takes on two forms. One form is using a tablet as a kiosk where customers can interact with the device. This may be used to deliver information about the establishment or its products to the consumer, or to act as an interface for customer loyalty programs in lieu of plastic cards. A second usage is for retail store associates to carry such a device around the store to assist customers. The associate may use the device to display a layout of the store to show a customer where an item is, check on a price of an item, or access information regarding a product the customer is buying. In some stores, tablets are being used to check-out customers. Restaurants may use smart devices at a table for ordering or game playing. Hospitals may allow doctors and nurses to carry smart devices for mobile access to patient health charts.

This trend may require the customer, store associate or employee to leave the smart device unattended for a period of time to perform other tasks. Thus, there is a need for an anti-theft device for protecting a portable electronic device from theft, while allowing a sufficient level of user interaction with the portable electronic device.

BRIEF SUMMARY OF THE INVENTION

Embodiments of the present invention are directed to an anti-theft device for securing a portable electronic device from unauthorized removal or theft, wherein the anti-theft includes a shroud configured to at least partially receive and engage a portable electronic device; an EMV interface pivotably coupled to the shroud for moving between an open position and a closed position; and a dock configured to releasably engage the shroud. The EMV interface is further configured to operably couple to an EMV reader.

In another embodiment, an anti-theft device for securing a portable electronic device from unauthorized removal or theft is provided. The anti-theft device includes a shroud configured to at least partially receive and engage a portable electronic device; an EMV interface electrically coupled to the shroud and configured to operably couple to an EMV reader; and a dock configured to releasably engage the shroud.

According to another embodiment, a method for securing a portable electronic device from unauthorized removal or theft is provided. The method includes positioning a portable electronic device within the shroud; positioning the shroud and the portable electronic device on a dock such that the shroud and the portable electronic device are locked to the dock; and moving an EMV interface coupled to the shroud to an open position.

In one embodiment, a gang charger for providing power to a plurality of portable electronic devices is provided. The gang charger includes a plurality of shrouds each configured to at least partially receive and engage one of the plurality of portable electronic devices; a stand comprising a plurality of shelves, each shelf configured to receive and engage one of the plurality of shrouds; and a lock mechanism for locking each of the shrouds to a respective shelf.

In another embodiment, a method for providing power to a plurality of portable electronic devices is provided. The method includes inserting each of the plurality of portable electronic devices into engagement with a respective shroud; and positioning each of the shrouds on a respective shelf such that each of the shrouds locks to a respective shelf with a lock mechanism.

In another embodiment, an anti-theft device for securing a portable electronic device from unauthorized removal or theft is provided. The anti-theft device includes at least one adapter configured to releasably engage an input port on a portable electronic device; a shroud configured to at least partially receive and engage the portable electronic device for establishing electrical communication with the at least one adapter; and a dock configured to releasably engage the shroud, the dock being in electrical communication with the portable electronic device via the at least one adapter.

In one embodiment, an anti-theft device for securing a portable electronic device from unauthorized removal or theft is provided. The anti-theft device includes a shroud configured to at least partially receive and engage a portable electronic device; and a dock configured to releasably engage the shroud, the dock configured to engage the shroud in a locked configuration so as to prevent removal of the shroud and the portable electronic device from the dock and to disengage the shroud in an unlocked configuration so as to allow the shroud and the portable electronic device to be removed from the dock.

In another embodiment, an anti-theft device for protecting a portable electronic device from theft or unauthorized removal in a retail environment is provided. The anti-theft device includes a shroud configured to at least partially receive and engage a portable electronic device. The shroud includes a wireless communications interface that is configured to communicate and be paired with the portable electronic device. The anti-theft device also includes a dock configured to releasably engage the shroud. The dock is configured to engage the shroud in a locked configuration so as to prevent removal of the shroud and the portable electronic device from the dock and to disengage the shroud in an unlocked configuration so as to allow the shroud and the portable electronic device to be removed from the dock.

In one embodiment, an anti-theft device for securing a portable electronic device from unauthorized removal or theft is provided. The anti-theft device includes a shroud configured to at least partially receive and engage a portable electronic device, the shroud comprising a wireless communications interface configured to communicate and be paired with the portable electronic device. The anti-theft device also includes a dock configured to releasably engage the shroud, the dock configured to engage the shroud in a locked configuration so as to prevent removal of the shroud and the portable electronic device from the dock and to disengage the shroud in an unlocked configuration so as to allow the shroud and the portable electronic device to be removed from the dock.

In one embodiment, a method for securing a portable electronic device from unauthorized removal or theft is provided. The method includes positioning a portable electronic device within the shroud, the shroud comprising a wireless communications interface configured to communicate and be paired with the portable electronic device. The method also includes positioning the shroud and the portable electronic device on a dock such that the shroud and the portable electronic device are locked to the dock.

BRIEF DESCRIPTION OF THE DRAWINGS

FIG. 21 illustrates a cross-sectional view of a hinge connection according to one embodiment.

FIG. 22 illustrates a shroud with a hinge connected to an EMV interface in each of a closed position, partially open position, and an open position according to one embodiment.

DETAILED DESCRIPTION OF EMBODIMENTS OF THE INVENTION

Figure 1:
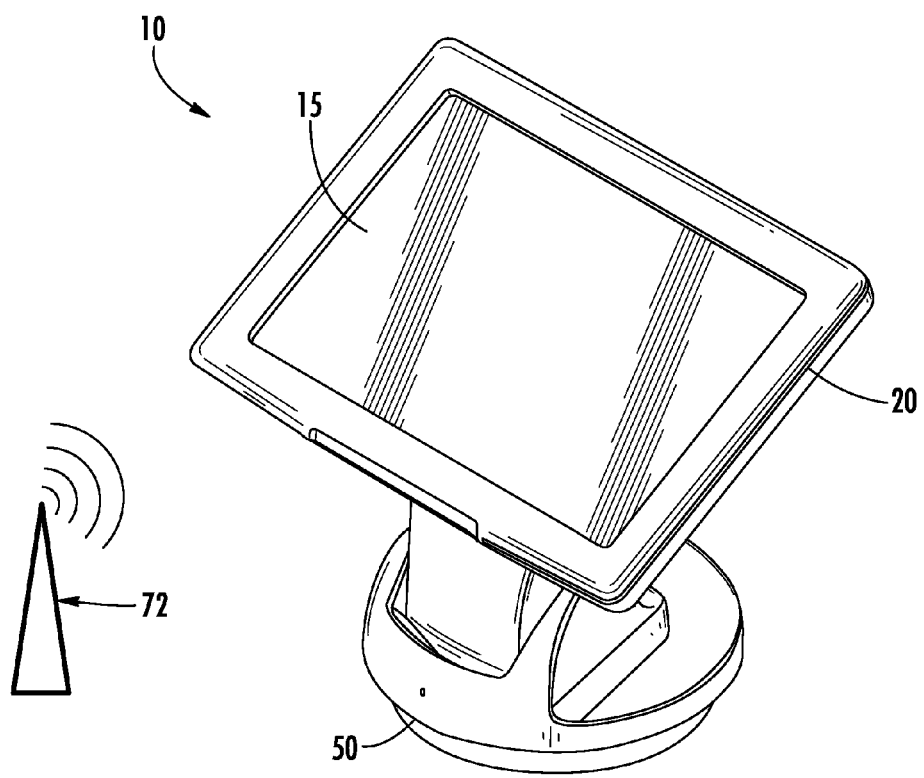
FIG. 1 illustrates an anti-theft device according to one embodiment of the present invention.

Reference will now be made to the accompanying drawing figures wherein identical reference numerals denote the same or similar parts, elements, components, assemblies, subassemblies or the like throughout the various views. The attached drawing figures show exemplary embodiments of an anti-theft device 10 for protecting a portable electronic device 15, for example, a tablet, against theft or unauthorized removal. As used herein, the term "tablet" is intended to include without limitation all types of portable, personal computers, for example, laptop, notebook, mini-notebook, sub-notebook and netbook type computers, as well as personal data assistant (PDA) and personal mobile communications (e.g., cell phone) type devices. The anti-theft device 10 may be suitable for use by customers or employees, such as a retail store associate, a teacher, a nurse, a doctor, a maintenance worker, or an airline pilot/attendant, in a variety of locations and environments.

Figure 2:
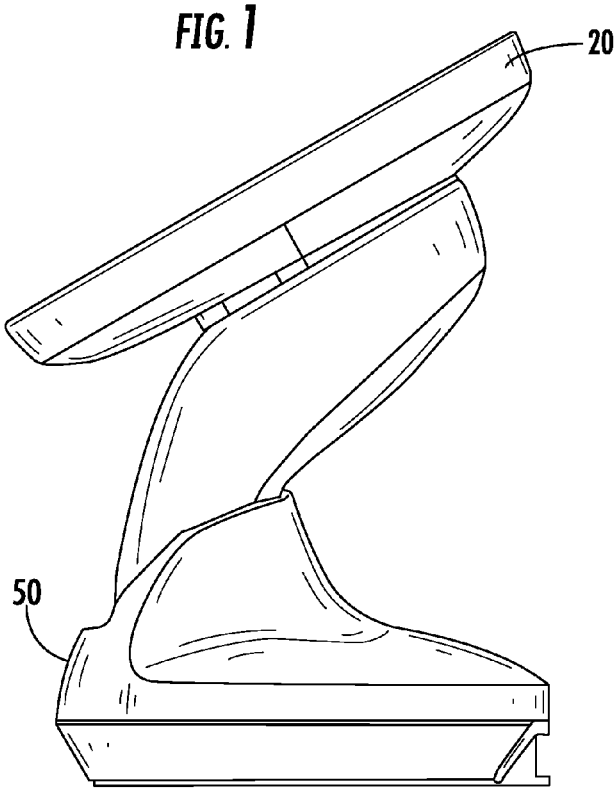
FIG. 2 illustrates a side view of a dock and shroud shown in FIG. 1.

FIG. 1 shows a portable electronic device 15, and in particular a tablet, for use with an anti-theft device 10 according to the invention. In one embodiment, the anti-theft device 10 includes a shroud 20, frame, sleeve, or the like that is configured to be attached to the portable electronic device 15 (see, e.g., FIGS. 1-2). The shroud 20 is configured to at least partially receive and surround the portable electronic device 15. According to one embodiment, the shroud 20 comprises a first portion 24 and a second portion 28 that that are configured to engage with one another (see, e.g., FIGS. 6-7). First portion 24 and second portion 28 of shroud 20 may be made of a formable, substantially rigid material, such as hard plastic, composite, or thin sheet metal. First portion 24 includes peripheral sides and a peripheral end that overlie and enclose the opposite sides and an end of the portable electronic device 15. Likewise, second portion 28 is provided with peripheral sides and a peripheral end that overlie and enclose the opposite sides and the other end of the portable electronic device 15. First portion 24 and second portion 28 may be secured together with portable electronic device 15 disposed therein and contained by the peripheral sides and peripheral ends by mechanical fasteners. The fasteners may be provided with a tamper-proof head that requires a customized tool that is not readily available to others so that the fasteners cannot be easily removed by a potential thief. Alternatively, the fasteners may be positioned on the first portion 24 and the second portion 28 so as to be inaccessible when the shroud 20 containing the portable electronic device 15 is locked in place on the dock 50, as will be described.

As previously mentioned, the anti-theft device 10 may further include a dock 50, stand, base, or the like for receiving and supporting the portable electronic device 15. The dock 50 may be configured to temporarily secure the portable electronic device 15 thereto. In turn, the dock 50 may be configured to be fixed to a support surface, such as a fixture, a counter, a wall, or the like, for example, with one or more fasteners and/or adhesive. In some instances, the portable electronic device 15 is configured to be readily placed on the dock 50 and removed by an authorized user. For example, a retail store associate may utilize a portable electronic device 15 for point-of-sale transactions and wish to temporarily secure the device against theft or unauthorized removal. As such, the dock 50 may also be configured to be alarmed, locked, and/or otherwise secured so that unauthorized persons cannot remove the portable electronic device 15. In one embodiment, the dock 50 includes an alarming device (e.g., an alarm and monitoring electronics) configured to arm when the portable electronic device 15 is positioned within the dock 50, and to disarm when the portable electronic device is removed by an authorized user. The portable electronic device 15 may be operably engaged with the dock 50 and/or with an alarming device in a wireless manner (i.e., no tether is required), although wired means may be used if desired.

Figure 5:
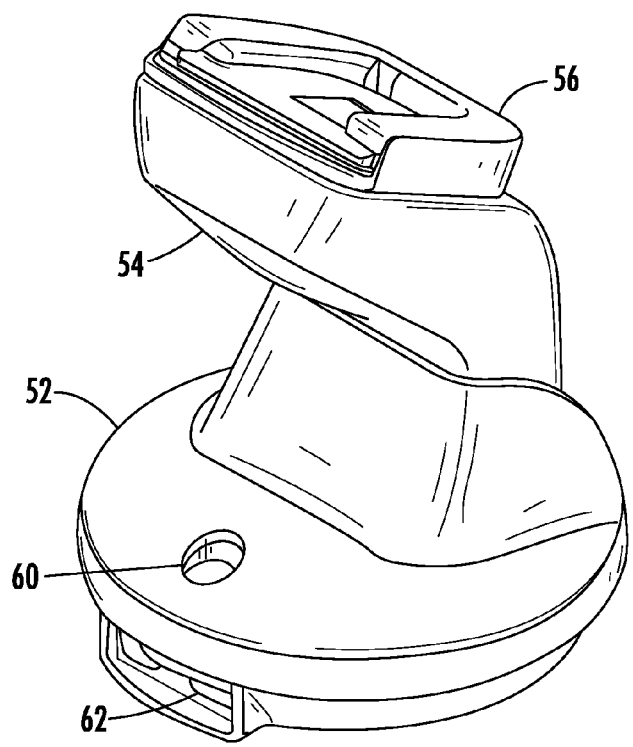
FIG. 5 illustrates embodiment rear perspective view of the dock shown in FIG. 1.

The dock 50 may include various input and/or output connections 62 for communicating power, data, and/or security signals with the portable electronic device 15, shroud 20, and/or dock 50 (see, e.g., FIG. 5). For instance, the dock 50 may include various data outputs and video outputs, such as for communicating with one or more peripheral devices (e.g., a keyboard, mouse, etc.). Moreover, the dock 50 may include one or more data ports (e.g., USB ports) for communicating with the portable electronic device 15, such as for receiving data from or providing data to the portable electronic device 15.

The dock 50 may include alarm and monitoring electronics for activating the alarm in the event that the shroud 20 and the portable electronic device 15 are detached from the dock 50 in an unauthorized manner. The monitoring electronics may be configured to monitor one or more sensors or switches and to activate an audible or visible alarm signal in response to a security event. Moreover, the dock 50 may include a processor or controller that is operably engaged with the monitoring electronics, a motor, switches, an alarm, etc.

Figure 3:
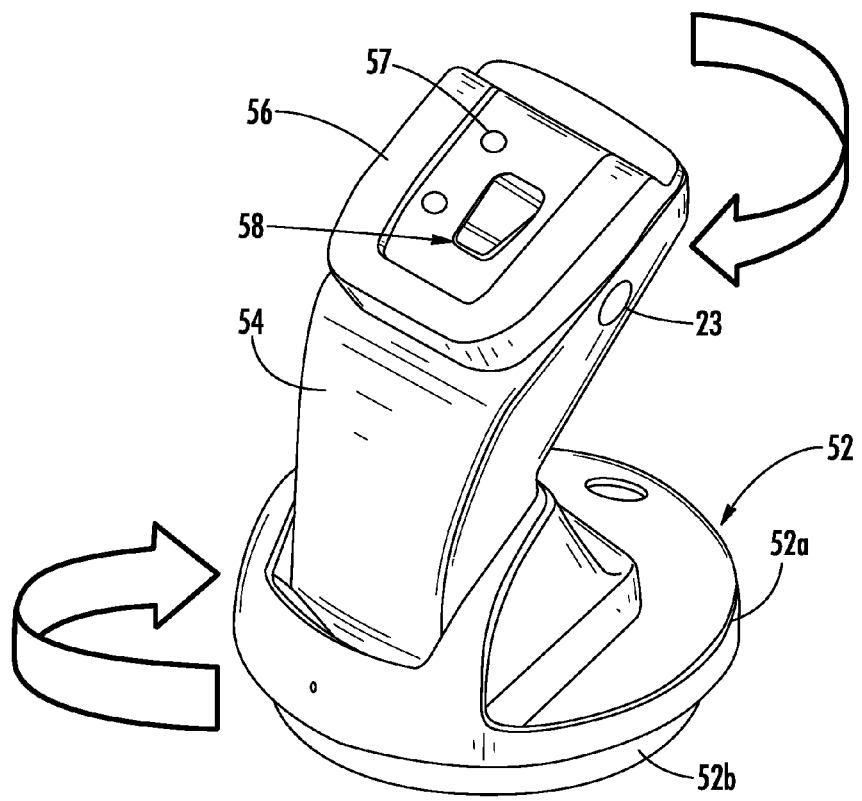
FIG. 3 illustrates a perspective view of the dock shown in FIG. 1.
Figure 4:
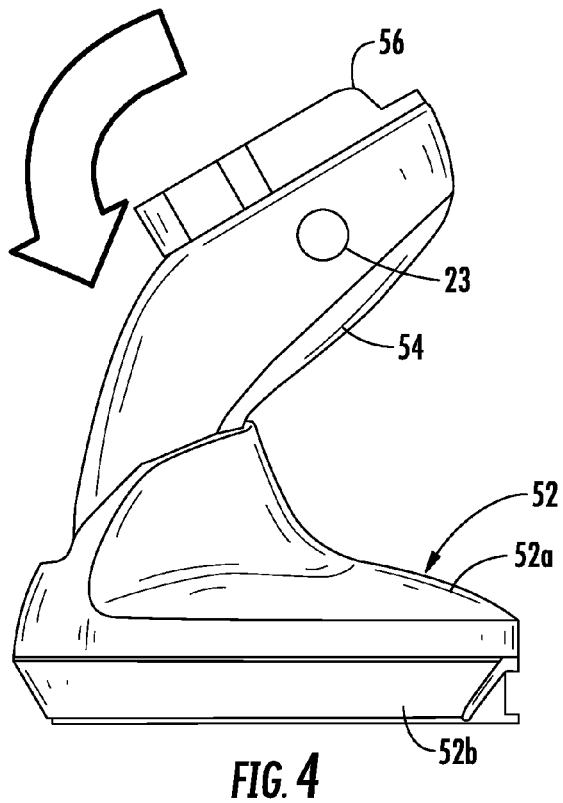
FIG. 4 illustrates a side view of the dock shown in FIG. 1.

FIGS. 3-5 show an embodiment of a dock 50 configured to support and secure the shroud 20 and portable electronic device 15, although other shapes and configurations are possible for supporting a variety of portable electronic devices 15. In this example, the dock 50 includes a base member 52, a stand member 54, and an engagement member 56. The base member 52 may be configured to be secured to a support surface. Moreover, the dock 50 may be configured to support the portable electronic device 15 in one of a plurality of desired orientations (e.g., portrait or landscape). Alternatively, the shroud 20 may be configured to rotate about the dock 50 so as to be positioned in any desired orientation (e.g., rotatable 360 degrees).

In another embodiment, the shroud 20 may be configured to have a plurality of degrees of freedom relative to the dock 50. For example, the shroud 20 may be configured to rotate about at least two axes of rotation. FIGS. 3-4 show an embodiment where the shroud 20 is configured to rotate about three axes of rotation. In this regard, the engagement member 56 of the dock 50 may be configured to rotate about one axis relative to the stand member 54, the base member 52 of the dock 50 may be configured to rotate about a second axis relative to the support surface, and the stand member 54 may be configured to rotate about a third axis relative to the base member 52. As such, a user is able to readily adjust the position of the portable electronic device 15 and the dock 50.

In one embodiment, the engagement member 56 may be configured to rotate between predetermined stop positions (e.g., between portrait and landscape orientations). Thus, in some cases, the engagement member 56 may be limited to less than a full rotation relative to the stand member 54. For example, the engagement member 56 may include a plate 56a having a plurality of notches 56b formed therein. The stand member 54 may include an actuator 23 connected to a spring rod 56c. When a user engages and compresses the actuator 23, the spring rod 56c is configured to rotate in unison with the plate 56a until the spring rod 56c encounters and engages with at least one of the plurality of notches 56b. At this time, rotation of the shroud 20 with respect to the stand member 54 is prevented until the actuator 23 is compressed again to prompt rotation of the shroud 20. In some embodiments, the plurality of notches 56b are disposed at predetermined 90° intervals thereby limiting each rotational movement of the shroud 20 to only 90° at a time. In some embodiments, the shroud 20 is only able to rotate a maximum of 180° with respect to the stand member 54. In one embodiment, the engagement member 56 may include a conduit engaged with a PCB contained therein. The conduit may have a centralized port configured to receive wires/cables routed therethrough. The conduit allows for the wires/cables to move in unison as the engagement member 56 rotates thereby preventing the wires/cables from tangling and/or undergoing undue stress.

Figure 16:
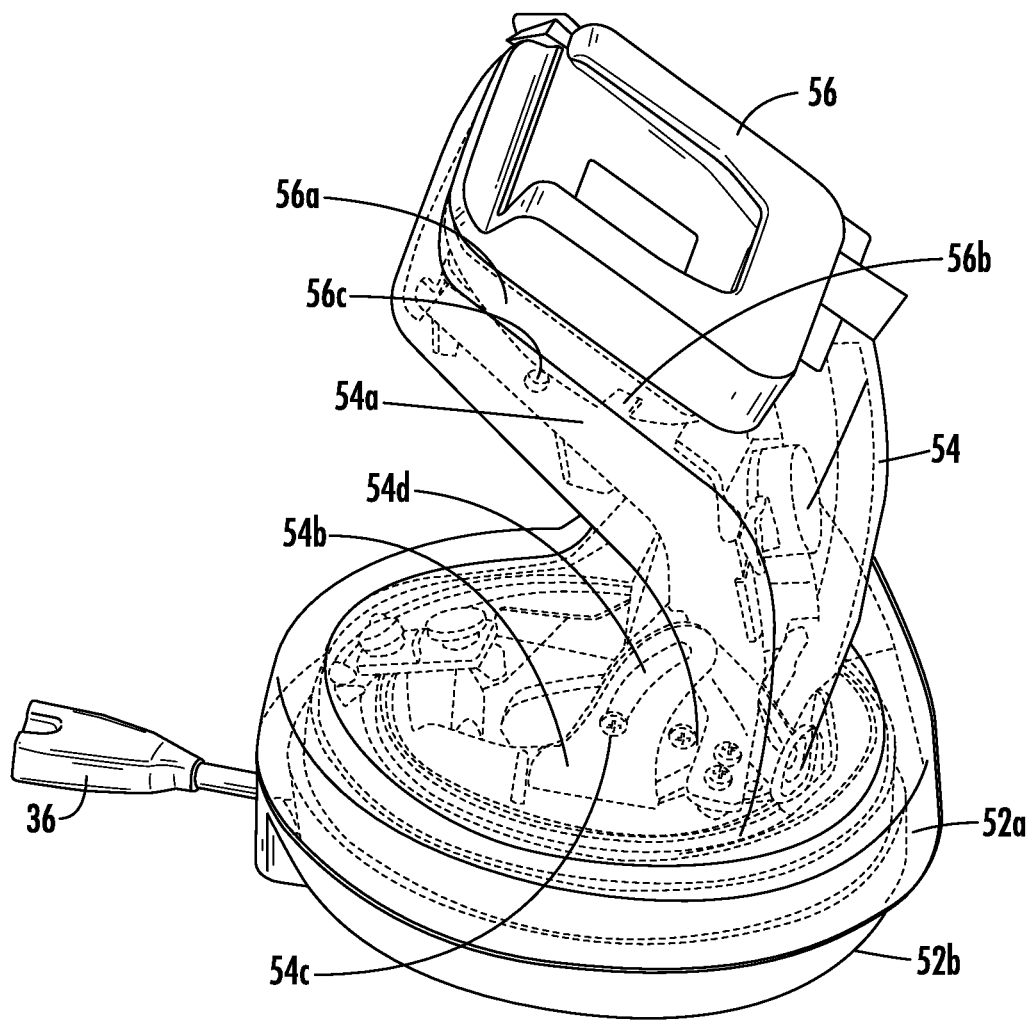
FIG. 16 illustrates a perspective view of a dock according to one embodiment.

In some embodiments, the stand member 54 may be configured to pivot relative to the base member 52 between predetermined angles (see, e.g., FIG. 16), and the base member 52 may be configured to rotate relative to the support surface between predetermined angular positions. For example, the stand member 54 may include an angular attachment 54a connected to a plurality of spaced arm brackets 54b by a fastener 54c. In this example, a pair of spaced arm brackets 54b are employed. When the stand member 54 is pivoted with respect to the base member 52, the fastener 54c rides along and symmetrically follows an arc shaped slot 54d formed in both arm brackets 54b. As the fastener 54c reaches an uppermost portion of the slot 54d, the stand member 54 is prevented from pivoting any further. Similarly, as the fastener 54c reaches a lowermost portion of the slot 54d, the stand member 54 is prevented from pivoting any further. Additionally, angular attachment 54a may be positioned between the two arm brackets 54b. Arm brackets 54b may be angled inwardly towards one another to thereby engage with the angular attachment 54a. As such, arm brackets 54b may be configured to act as a friction mechanism thereby adding resistance between the angular attachment 54a and the arm brackets 54b and creating a friction fit between the stand member 54 and the base member 52 in order to maintain the stand member at a desired angle. The arm brackets 54b create enough resistance to maintain the stand member 54 at a desired angle with respect to the base member 52, but the resistance is able to be overcome to move the stand member 54, but not allowing the stand member 54 to move freely with respect to the base member 52.

In some embodiments, the base member 52 includes an upper base member 52a and a lower base member 52b wherein the upper base member 52a is configured to rotate relative to the lower base member 52b. In this instance, the lower base member 52b is stationary with respect to the upper base member 52a and the support surface. As such, an input and/or output connection 62 contained in the lower base member 52b may be configured to be stationary and fixed in one direction. In some embodiments, one or more input and/or output connections 62 may be located on an outer surface of the lower base member 52b, and the lower base member 52b may include one or more slots formed in a bottom surface thereof such that wires and/or cables extending from the input and/or output connections 62 may be routed and extended through an opening formed in the support surface. This allows for a clean and presentable look wherein wires and/or cables are hidden from view.

In some embodiments, the shroud 20 may include a hub member 22 or other engagement member 56 that is configured to mate with a corresponding engagement member 56 of the dock 50. The hub member 22 may be releasably attached to the shroud 20 in some cases such that the hub member 22 may be attached and detached from the shroud 20 (e.g., via one or more proprietary fasteners). Thus, the hub member 22 may be adaptable to various types of shrouds 20 in some embodiments. In the embodiment shown in FIGS. 6-7, the hub member 22 may have a "dovetail" shape that is configured to engage a corresponding engagement member 56 having a similar dovetail shape. The hub member 22 may be configured to releasably engage the engagement member 56, such as in a snap fit, and be locked to the dock 50 as explained in further detail below. For example, FIG. 3 shows that the engagement member 56 may include a lock mechanism 58 configured to engage the hub member 22 in a locked configuration.

In some embodiments, the hub member 22 may be configured to allow the shroud 20 to rotate when the shroud 20 is not positioned on the dock 50. For example, the hub member 22 may include an inner plate 22a concentric with an outer plate 22b (see FIG. 18) wherein rotation of outer plate 22b with respect to the inner plate 22a causes the shroud 20 to rotate. The inner plate 22a and/or the outer plate 22b may include a plurality of detents which facilitates "soft" intermittent stops as the shroud 20 rotates. In this regard, a user can remove the shroud 20 from the dock 50 and readily adjust the position of the portable electronic device 15 in a portrait, landscape, or other orientation as needed. In one embodiment, the inner plate 22a and/or the outer plate 22b may include at least one detent at the "home' position which indicates a "hard" stop thereby allowing the shroud 20 to be in position for docking.

Figure 10:
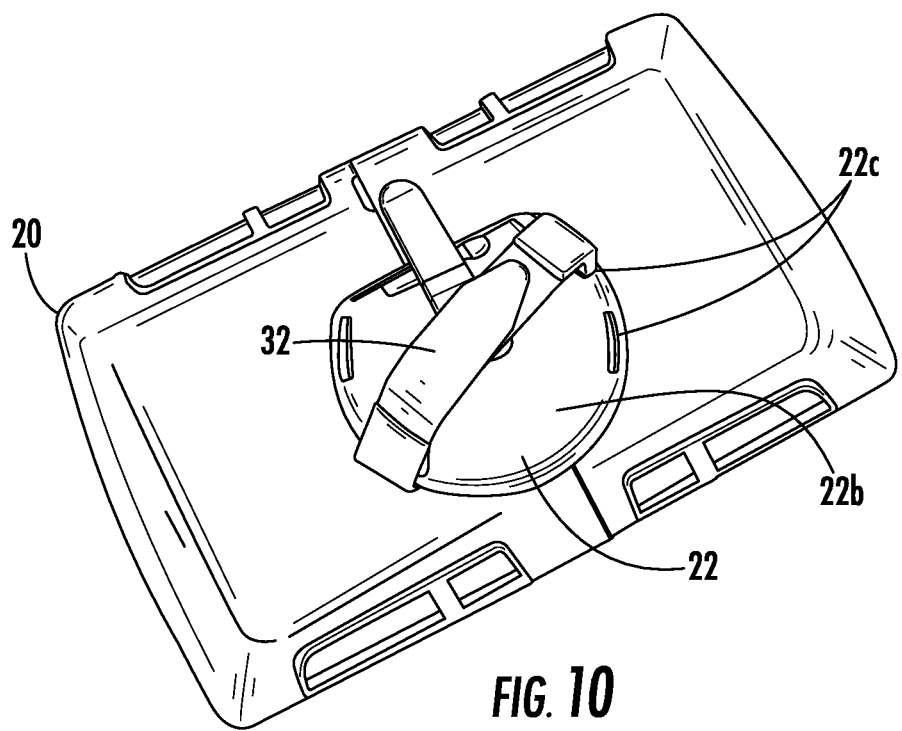
FIG. 10 illustrates a shroud and a handle according to one embodiment.
Figure 18:
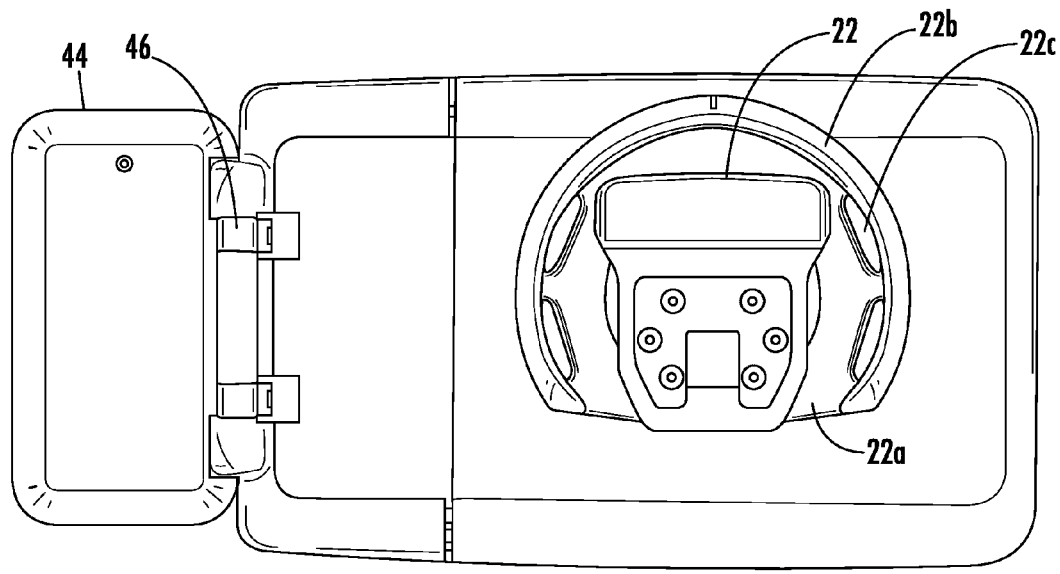
FIG. 18 illustrates a plan view of the shroud that is opposite to the plan view shown in FIG. 17.
Figure 19:
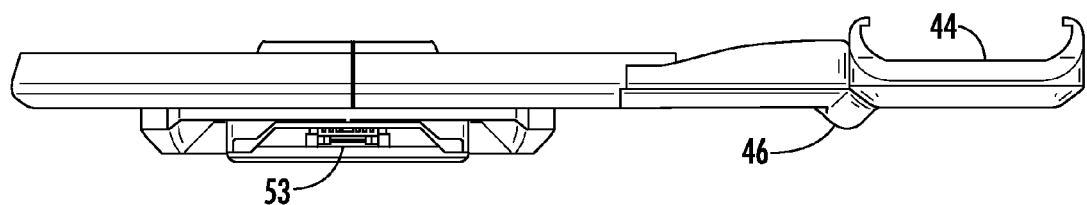
FIG. 19 illustrates an end view of the shroud shown in FIG. 17.

In some embodiments, the hub member 22 may also be configured to house various electronic components, such as circuitry or printed circuit board, a wireless communications interface, data input and/or outputs, an alarm, and/or a power source. For example, the hub member 22 may include a Bluetooth module configured to be paired with and communicate with the portable electronic device 15, as also explained in further detail below. The data input and/or outputs may allow for interfacing with one or more peripheral devices. In some cases, the hub member 22 may be configured to engage one or more accessories. In some embodiments, as shown in FIGS. 10 and 18 an outer plate 22b of the hub member 22 may include apertures 22c configured to be engaged with a handle 32. Handle 32 allows a user the flexibility of using the portable electronic device 15 removed from the dock. Moreover, the shroud 20 and/or hub member 22 may include an alarm for generating an audible and/or a visible signal. In some cases, the system 10 may leverage the portable electronic device 15 for generating an alarm signal, such by emitting an alarm signal via a speaker in the tablet.

Figure 8:
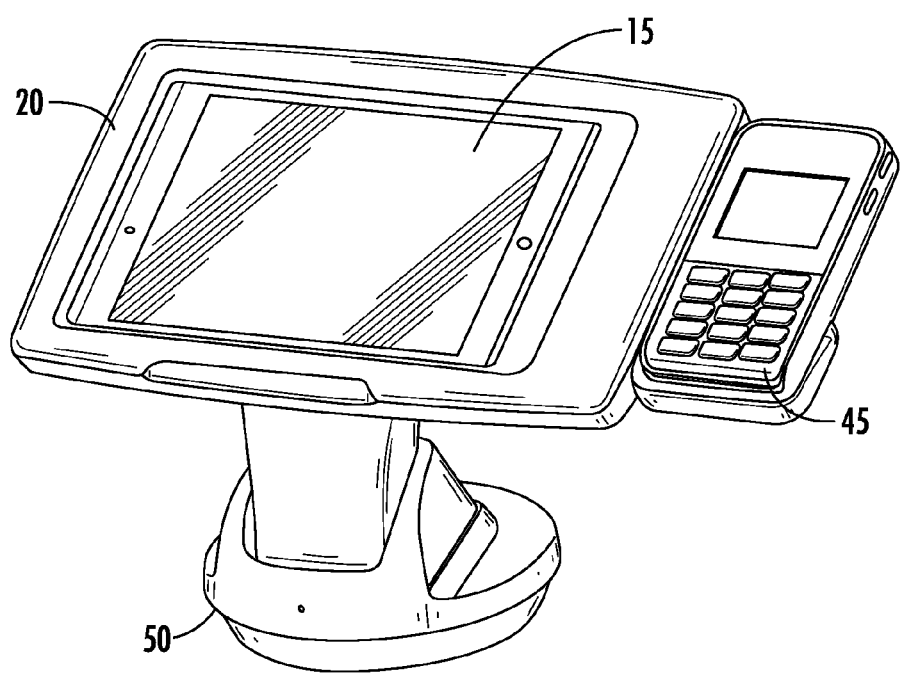
FIG. 8 illustrates a perspective view of an anti-theft device according to another embodiment.
Figure 9:
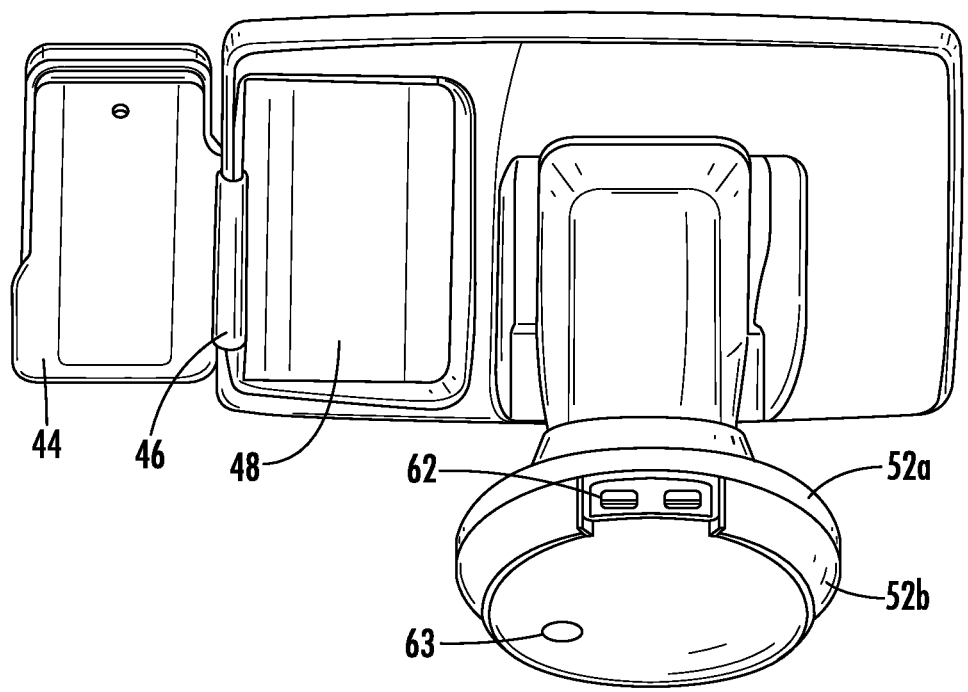
FIG. 9 illustrates a rear perspective view of the anti-theft device shown in FIG. 8.

In other embodiments, the shroud 20 may be configured to accommodate one or more accessories. For instance, FIGS. 8-9 show that the shroud 20 may include a mobile payment terminal interface, such as an EMV interface 44, for receiving a mobile payment device or terminal, such as an EMV reader 45. The EMV interface 44 may be integrally formed with the shroud 20 in some cases, or the EMV interface 44 may be attached to the shroud 20. For example, the EMV interface 44 may be pivotally attached to the shroud 20 with a hinge 46 such that the EMV interface 44 may be moved between use and non-use states. As shown in FIG. 9, the shroud 20 may define a recess 48 that is configured to receive the EMV reader 45 in a non-use position. When a user desires to use the EMV reader 45, the EMV reader 45 may be readily pivoted out of the recess 48. The EMV interface 44 is configured to interface with any number of EMV readers 45, although in some cases, the EMV interface 44 may be customized for a particular type of EMV reader 45. In some embodiments, the EMV interface 44 may be removably attached to the shroud 20 and may be interchangeable with another different EMV interface 44. Thus, the shroud 20 may be configured to accommodate different types of EMV readers 45. In addition, the dock 50 may be configured to accommodate any type of portable electronic device 15, shroud 20, and/or EMV reader 45. The EMV interface 44 may be configured to receive and engage the EMV reader, such as in a snap fit. The EMV interface 44 may also include an actuator 44a such as a micro-switch, wherein the actuator 44a is configured to detect if the EMV reader 45 is engaged with the EMV interface 44. The actuator 44a may facilitate communication with the EMV interface 44, such as to enable power and/or data to be transferred to the EMV reader 45 when the EMV reader is disposed within the EMV interface 44 and to disable power and/or data transfer to the EMV reader 45 when the EMV reader 45 is removed from the EMV interface 44.

Figure 23:
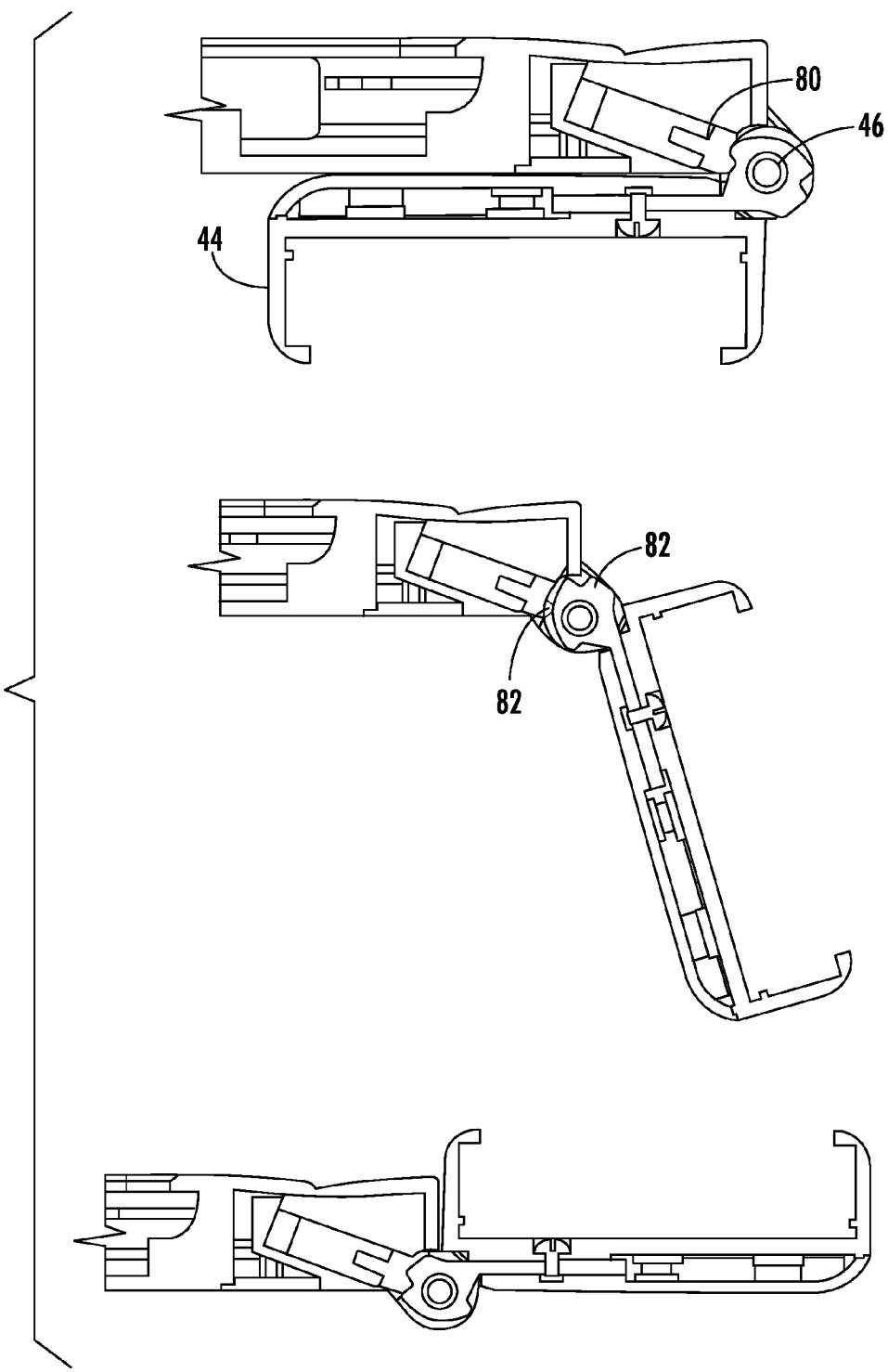
FIG. 23 illustrates an enlarged view of a shroud with a hinge connected to an EMV interface in each of a closed position, partially open position, and an open position according to one embodiment.

In some embodiments, the EMV interface 44 may be configured to be secured in an open or use position and a closed or non-use position (see, e.g., FIG. 22). For instance, the hinge 46 may include a holding mechanism 80 configured to bias and/or hold the EMV interface 44 in the open position such that the EMV interface 44 will not move to the closed position without applying a predetermined amount of force. In other words, the EMV interface 44 will remain in the open position during use without user intervention. Similarly, the holding mechanism 80 may be configured to bias and/or hold the EMV interface 44 in the closed position. In the embodiment shown in FIG. 23, the holding mechanism 80 and hinge 46 may include one or more detents 82 configured to engage one another in the open and closed positions. When the hinge 46 is between the open and closed positions, the detents 82 are not in engagement with one another, and the hinge 46 is freely rotatably relative to the shroud 20. Thus, when the detents 82 mate with and engage one another, the detents 82 are configured to hold the EMV interface 44 in an open or closed position. The holding force between the detents 82 may be overcome by rotating the EMV interface 44 whereby the detents 82 are configured to cam against one another for allowing the EMV interface 44 to rotate relative to the hinge 46.

Figure 17:
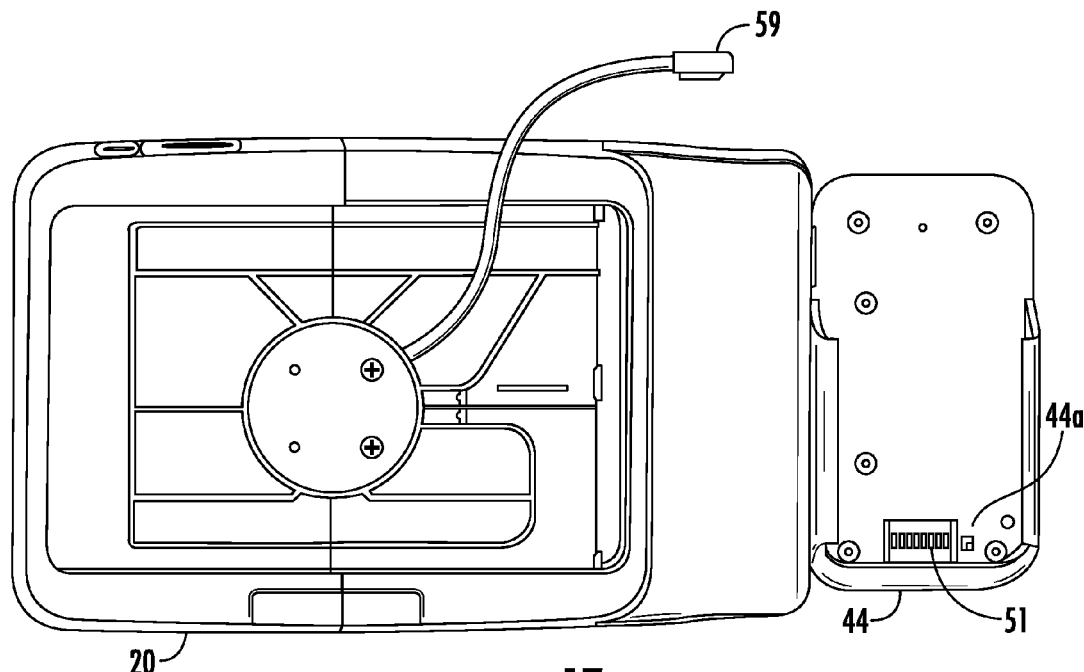
FIG. 17 illustrates a plan view of a shroud with an EMV interface according to one embodiment.
Figure 20:
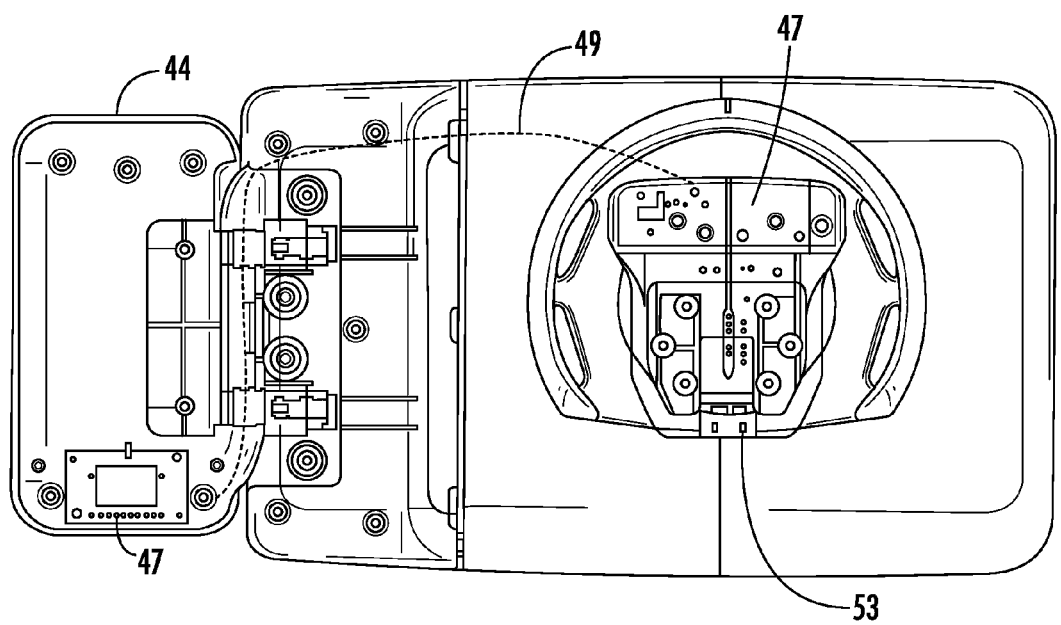
FIG. 20 illustrates a partial view of a shroud with an EMV interface according to one embodiment.

In one embodiment, the hinge 46 may facilitate an electrical connection between the shroud 20 and the EMV interface 44. In this regard, one or more electrical conductors 49 (e.g., wires) may be configured to be routed between a PCB 47 located within the hub member 22 and a PCB 47 located within the EMV interface 44 (see, e.g., FIGS. 20-21). In this way, no wires are visible and do not interfere with the operation or handling of the shroud 20. In addition, the electrical conductors 49 undergo limited stress due to the conductors 49 extending along the axis of the hinge 46. For example, the hinge 46 may be hollow and allow one or more wires 49 to be routed therethough, while the ends of the wire(s) are electrically connected to the PCBs 47 in the EMV interface 44 and the hub member 22. Additionally, in some embodiments, the shroud 20 may include slots defined therein such that conductors may be routed therethrough and connected directly to the portable electronic device 15 housed within the shroud 20. In some embodiments, conductors may be configured to be routed through the slots and then routed through the hinge 46 to facilitate an electrical connection with the EMV interface 44. The electrical connection between the PCBs 47 may allow the EMV reader 45 to be charged and/or transfer data while the shroud 20 is engaged with the dock 50. As shown in FIG. 17, the EMV interface 44 may include one or more electrical contacts 51 for facilitating such an electrical connection, while the shroud 20 may include a connector 53 (see FIG. 20) configured to engage an associated connector 55 on the dock 50 (see, e.g., FIG. 15). The engagement member 56 may be sized and configured to receive the hub member 22 in a sliding engagement such that the connectors 53, 55 align and engage one another when the shroud 20 is seated on the dock 50.

The dock 50 may include a mechanical mechanism or sensor, such as a pressure or plunger switch, operably engaged with the alarm and monitoring electronics that is configured to activate in response to engagement and disengagement with the portable electronic device 15 and/or the shroud 20. Likewise, the dock 50 may include a mechanical mechanism or sensor 63 that is configured to sense if the dock 50 has been removed from a support surface in an unauthorized manner. The mechanical mechanism or sensor 63 may also be configured to carry out other functions as detailed below. The authorized user may utilize a key, pass code, RFID, or the like to unlock the portable electronic device 15 and shroud 20 from the dock 50 and/or to disarm the alarm and monitoring electronics.

Figure 14:
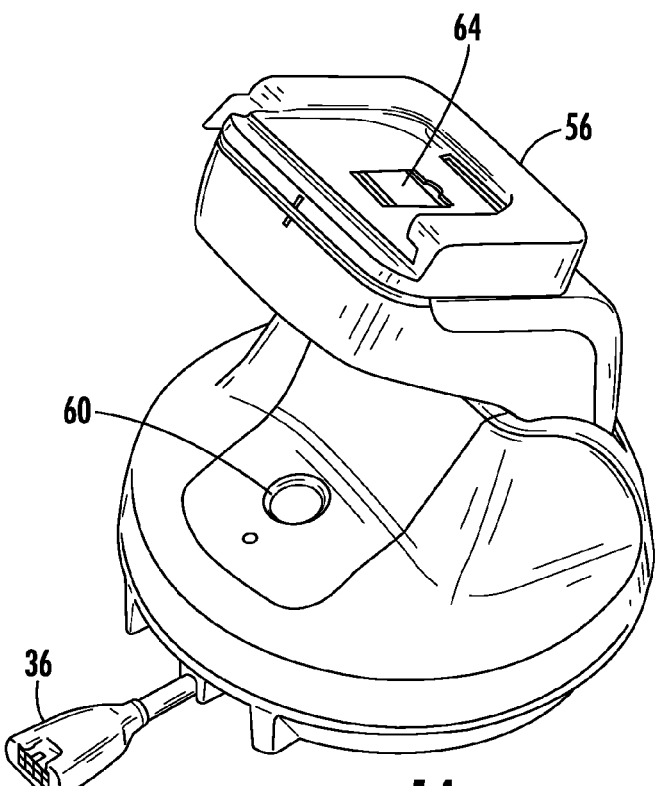
FIG. 14 illustrates a rear perspective view of a dock according to one embodiment.
Figure 15:
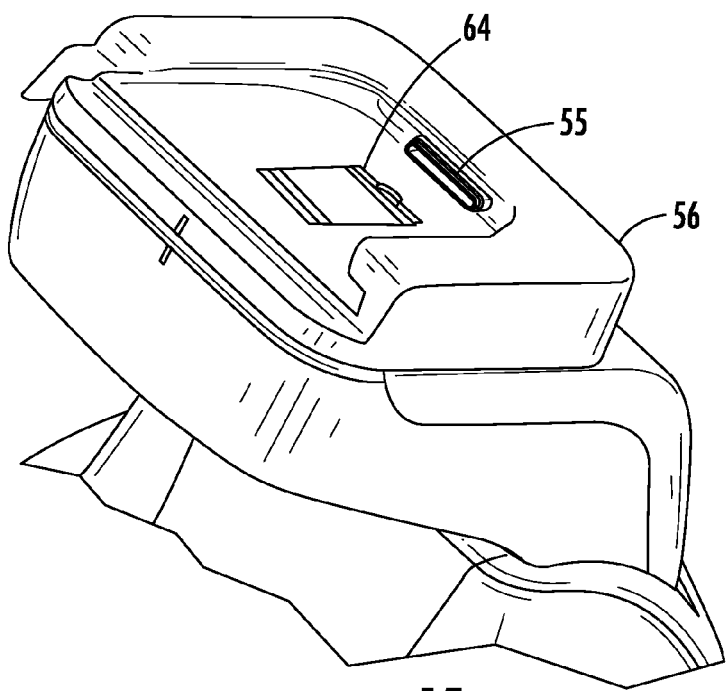
FIG. 15 illustrates an enlarged view of the dock shown in FIG. 14.

In some cases, the shroud 20 may only be unlocked when the engagement member 56 is in a predetermined location, which may be referred to as the "home" position, see, e.g., FIGS. 14-15. Thus, should the engagement member 56 be rotated away from the "home" position, the shroud 20 may not be able to be removed from the dock 50, which may be due to the inability of a lock mechanism 58 to be actuated in particular positions. In one embodiment, the dock 50 may include a sensing device (e.g., a mechanical switch) that is configured to detect the rotational position of the engagement member 56 relative to the stand member 54. For instance, a mechanical switch may be configured to be actuated when the engagement member 56 is not in the home position, while the switch is not actuated when in the home position.

In some embodiments, the dock 50 is configured to power and/or charge a portable electronic device 15 that is docked on the dock 50. In this case, the anti-theft device 10 may include a power cord (see FIGS. 14 and 16) coupled to the dock 50, inductive charging functionality, or a contact charging functionality. For example, the dock 50 may pass power to the portable electronic device 15 and/or EMV reader 45 via the shroud 20 that is connected to a power input port of the portable electronic device 15 via a connector 36. When the shroud 20 is docked on the dock 50, the dock 50 is configured to pass power to the shroud 20, the portable electronic device 15, and/or the EMV interface 44. An LED or other signaling device may be used to indicate that the anti-theft device 10 is armed. In addition, the alarm and monitoring electronics may be configured to generate an alarm signal (e.g., an audible and/or visible alarm) in response to unauthorized removal of the portable electronic device 15, shroud 20, and/or EMV reader 45 from the dock 50.

Figure 6:
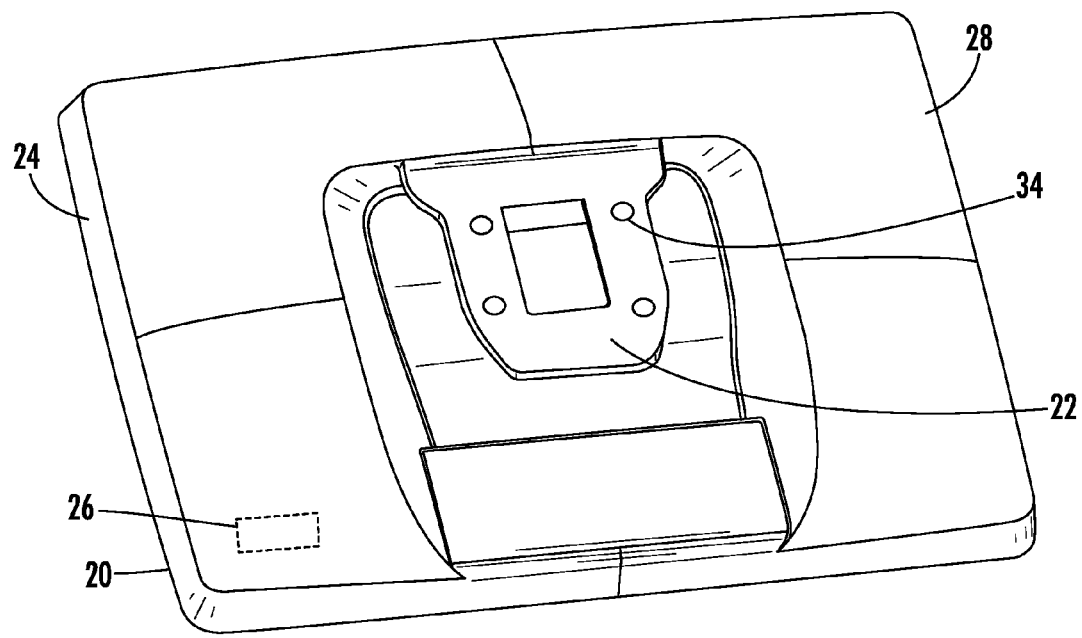
FIG. 6 illustrates a perspective view of a shroud and a hub member according to one embodiment.
Figure 7:
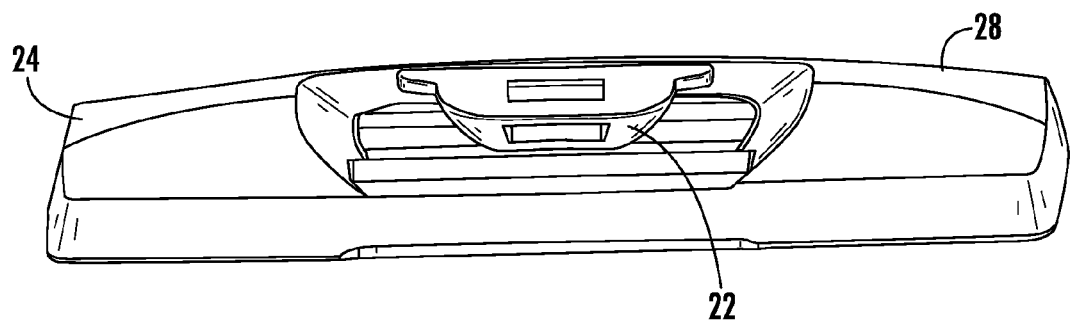
FIG. 7 illustrates the shroud and a hub member of FIG. 6.

In one embodiment, FIG. 6 shows a shroud 20 that includes one or more electrical contact(s) 34 for electrically communicating with corresponding electrical contact(s) 57 on the dock 50. The contacts 34 may be located on the hub member 22 in some cases, or in other embodiments, the contacts 34 may be located on any other desired location on the shroud 20. The shroud 20 may include a connector 59 (see, e.g., FIG. 17) for engaging a power and/or input port on the portable electronic device 15. The shroud 20 may include one or more electrical conductors 49 (e.g., power and ground) extending between the contact(s) 34 and the connector 59. The connector 59 may be any suitable connector configured to engage a power and/or input port of the portable electronic device 15, for example a micro-USB or USB-C connector. The electrical conductors 49 between the contacts 34 of the shroud 20 and the corresponding contacts 57 provided on the dock 50 may also define a detectable sense loop that is in electrical connection with the monitoring electronics. Thus, should the shroud 20 be removed from the dock 50 in an unauthorized manner (e.g., without first disarming the monitoring electronics with a key), the monitoring electronics may sense the break in the sense loop and generate an alarm signal. Similarly, the connector 53 may be configured for electrically connecting to the EMV reader 45 for communicating (e.g., power and/or data signals) with the portable electronic device 15, shroud 20, and/or dock 50. Moreover, as discussed above, the connectors 53, 55 may facilitate communication with the electronic device 15 and/or EMV reader 45.

Figure 24:
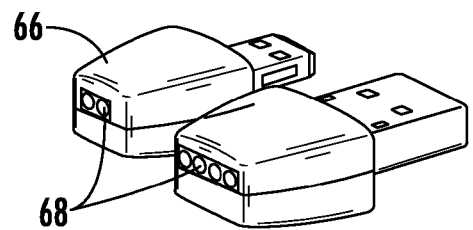
FIG. 24 illustrates a perspective view of an adapter according to one embodiment.
Figure 25:
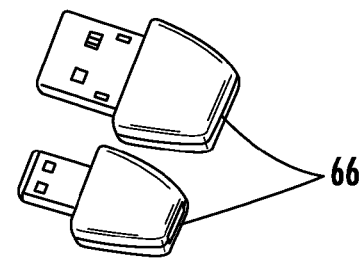
FIG. 25 illustrates another perspective view of the adapter shown in FIG. 24.
Figure 26:
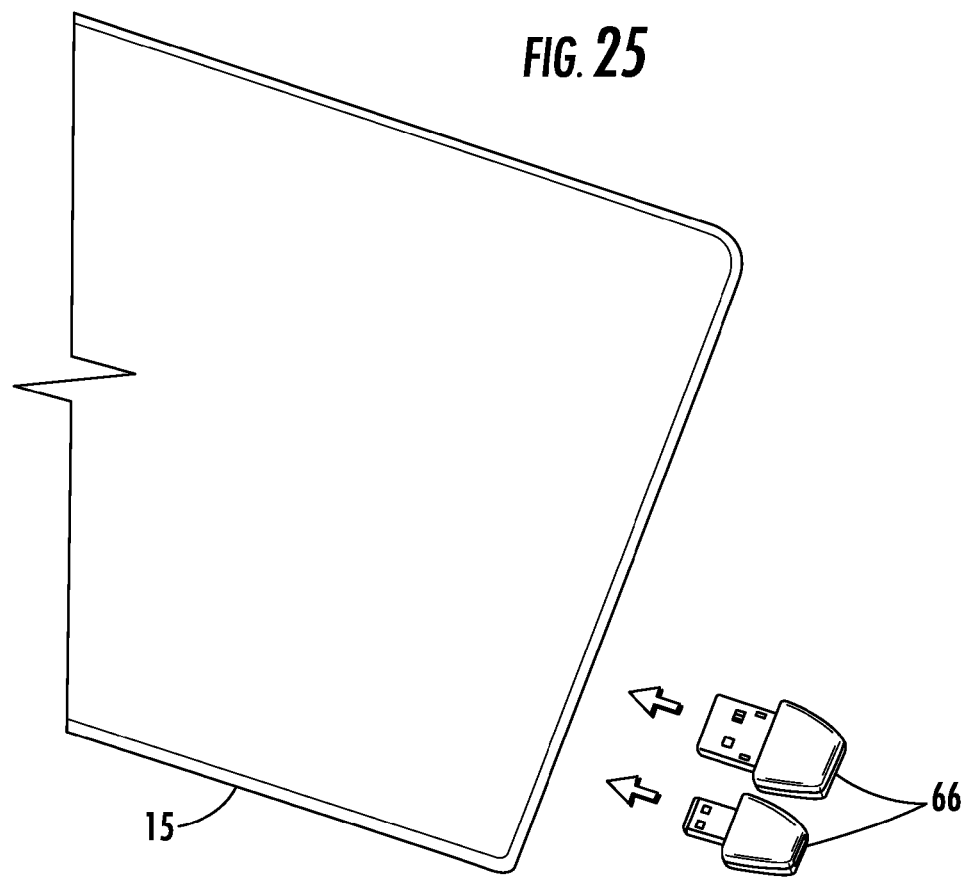
FIG. 26 illustrates the adapters of FIG. 24 prior to connection with a portable electronic device.
Figure 27:
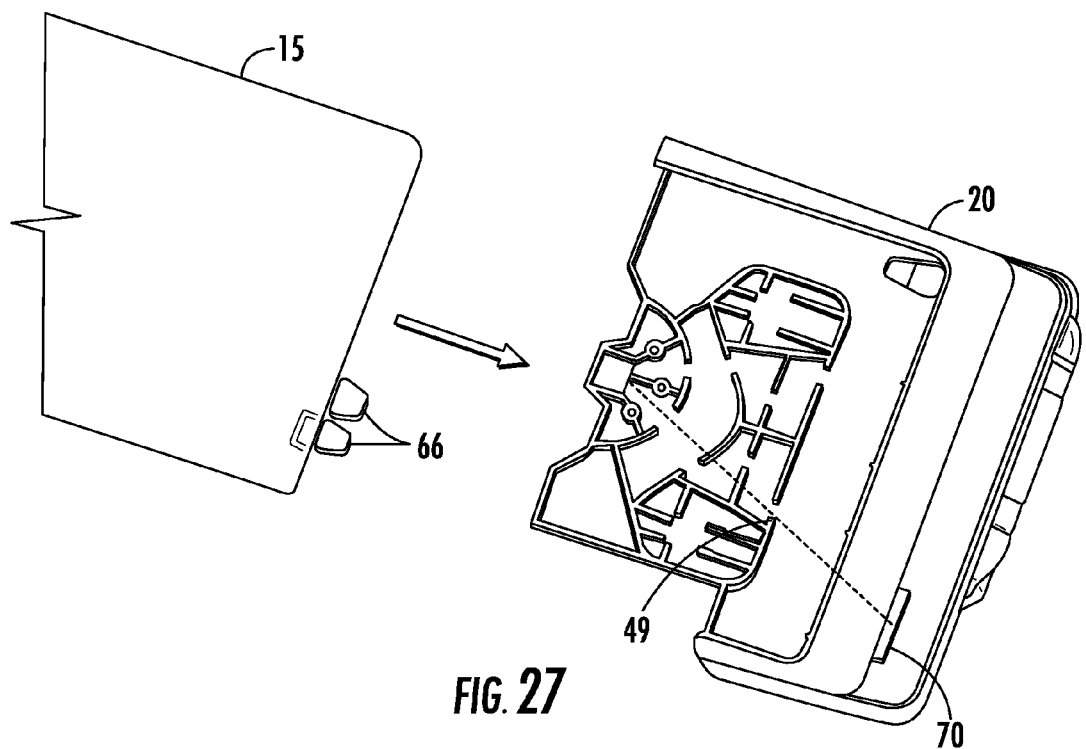
FIG. 27 illustrates the portable electronic device connected to the adapters of FIG. 24 prior to engagement with a shroud according to one embodiment.

In one embodiment, the shroud 20 may facilitate electrical communication with the portable electronic device 15 using one or more adapters 66 (see FIG. 24). For example, the electronic device 15 may include one or more input ports for power and/or data communication, and in some cases, the electronic device has a plurality of input ports. In order to facilitate such communication between the shroud 20 and portable electronic device 15, the adapter 66 may serve as an interface between the portable electronic device 15 and the shroud 20. The adapter 66 may be configured to be inserted within an input port of the portable electronic device 15 or otherwise electrically connect to the input port (see, e.g., FIGS. 26-27). The adapter 66 may include one or more electrical contacts 68 that are configured to align with and electrically connect to one or more corresponding electrical contacts 70 within the shroud 20. When the portable electronic device 15 is engaged with the shroud 20, the electrical contacts 68, 70 are electrically connected to one another thereby facilitating an electrical connection between the portable electronic device, the shroud 20, and the dock 50 when the shroud 20 is engaged with the dock 50. For example, the electrical contacts 70 may be electrically connected to one or more electrical conductors 49, which may in turn be connected to a PCB within the shroud 20. Any number of adapters 66 may be employed depending on the number of input ports on the electronic device 15. In this way, the number and arrangement of wires routed within the shroud 20 may be reduced or eliminated, and the electrical contacts 68 on the adapter 66 and electrical contacts 70 may be sized and configured to ensure an adequate electrical connection. Moreover, it is understood that the adapters 66 may employ wireless means in other embodiments, such as via electrical inductance or wireless communication (e.g., Bluetooth).

In some embodiments, the anti-theft device 10 comprises a lock mechanism 58 for securing the portable electronic device 15 on the dock 50. The lock mechanism 58 may include any combination of electrical, magnetic, inductive, and/or mechanical interaction. For example, the lock mechanism 58 may be configured to automatically lock when the portable electronic device 15 is positioned onto the dock 50. In some embodiments, the lock mechanism 58 may be actuated mechanically and/or electronically, such as via one or more electrically driven solenoids. For instance, the lock mechanism 58 may include actuator 64 disposed on a portion of the engagement member 56 that is configured to be actuated in response to engagement with a solenoid. In this example, the actuator 64 may be biased towards a locked position such that engagement of the shroud 20 with the dock 50 results in automatically locking the shroud 20 to the dock 50. In order to unlock the shroud 20 from the dock 50, the solenoid may be activated to engage the actuator 64 to allow the shroud 20 to be removed from the engagement member 56.

In order to release the shroud 20 and the portable electronic device 15 from the dock 50, an authorized user could use an electronic key or other suitable security means (e.g. a pass code) to disarm the alarming device (e.g., alarm and monitoring electronics) and/or disengage the lock mechanism 58. For example, FIGS. 5 and 14 show that the dock 50 includes a port 60 for communicating with an electronic key for arming and/or disarming the alarming device.

An unlocking feature for removing the portable electronic device 15 or disarming the alarming device may take many forms, including those discussed above. One embodiment is an electronic key utilizing radio frequencies, infrared, or some other electronic means to communicate with the monitoring electronics of the dock 50 and/or the alarming device to allow the portable electronic device 15 to be released. For example, the dock 50 may include a port 60 for receiving a signal from the electronic key having a unique identifying code recognizable by the dock 50, but otherwise unrecognizable by other docks 50 not associated with the code (e.g., in other departments or stores). In some embodiments, the portable electronic device 15 can be armed, disarmed, and/or silenced with the key, which may utilize mechanical, wireless, and/or electrical communication between the portable electronic device 15 and the security key. In additional embodiments, the portable electronic device 15 and/or dock 50 may include near field communication (NFC) functionality and be configured to communicate with the key or an alarming device having NFC functionality for arming and disarming the portable electronic device 15 and/or dock 50. Alternatively, the alarming device may include "screen swipe" functionality and be configured to sense particular movement or motion of the portable electronic device 15 and/or the key to arm or disarm the portable electronic device 15 and/or dock 50. Likewise, the portable electronic device 15 and/or key may include biometric functionality for recognizing a particular user to arm or disarm the portable electronic device 15 and/or dock 50. As mentioned above, in some embodiments, the dock 50 may include a mechanical mechanism or sensor 63. In some embodiments, successive actuations of the mechanical mechanism or sensor 63 within a predetermined time (e.g., five or more actuations within at least 10 seconds) automatically resets the code or like authorization information such that a retail store or establishment would need to reprogram the dock with the prior code, a new code, or like authorization information.

As discussed above, the hub member 22 may include a wireless communications interface for communicating with the portable electronic device 15. In one embodiment, the hub member 22 includes a Bluetooth or Bluetooth Low Energy module configured to be paired with and communicate with the portable electronic device 15 via Bluetooth. For example, the portable electronic device 15 may include a software application configured to facilitate communication with the hub member 22 for facilitating locking or unlocking the lock mechanism 58. Thus, through the use of the software application, a user may be prompted with an input command, such as to enter an access code, present a key, provide biometric identification, etc., which allows the Bluetooth module in the portable electronic device 15 to communicate with the Bluetooth module in the hub member 22. An unlock command received by the hub member 22 may in turn be communicated to the dock 50 to unlock the lock mechanism 58. The Bluetooth modules may be configured to be paired to one another when the shroud 20 is placed on the dock 50 such that a portable electronic device 15 and shroud 20 pair may be used with any dock 50. In some cases, the Bluetooth module and the hub member 22 are configured to automatically paired together when the portable electronic device 15 is positioned within the shroud 20, while in other cases, the user may be prompted to initiate pairing with the shroud 20. In one embodiment, the shroud 20 may include an actuator (e.g., a push button) to facilitate pairing between the shroud 20 and the portable electronic device 15. The shroud 20 may also include an indicator (e.g., an LED) to indicate that the pairing process is in progress and/or complete. In some embodiments, the actuator may also be used for other purposes such as for toggling the alarm mechanism in the dock 50 from an active mode (e.g., wherein the alarm is configured to generate an audible and/or visible signal in response to a security event) to a silent mode (e.g., wherein the alarm will not generate an audible and/or visual signal but sends a message to an authorized person). In other embodiments, the software application may facilitate direct communication between the portable electronic device and the dock 50 using wired connections and without the use of Bluetooth.

In some embodiments, the hub member 22 includes a wireless communications interface that is configured to generate a signal that is detectable by the portable electronic device 15. For example, the wireless communications interface may function as a "tower 72" (see FIG. 1) that communicates signals, such as a signal including an identifier, and the portable electronic device 15 is configured to detect the signal and be paired with the detected wireless communications interface and associated shroud 20. The portable electronic device 15 may be configured to be paired to the hub member 22 having a particular identifier. The wireless communications interface may be configured to generate the signal at any appropriate time, such as upon docking the shroud 20 on the dock 50. For instance, docking the shroud 20 on the dock 50 may allow for power to be delivered to the wireless communications interface for generating detectable signals.

Figure 11:
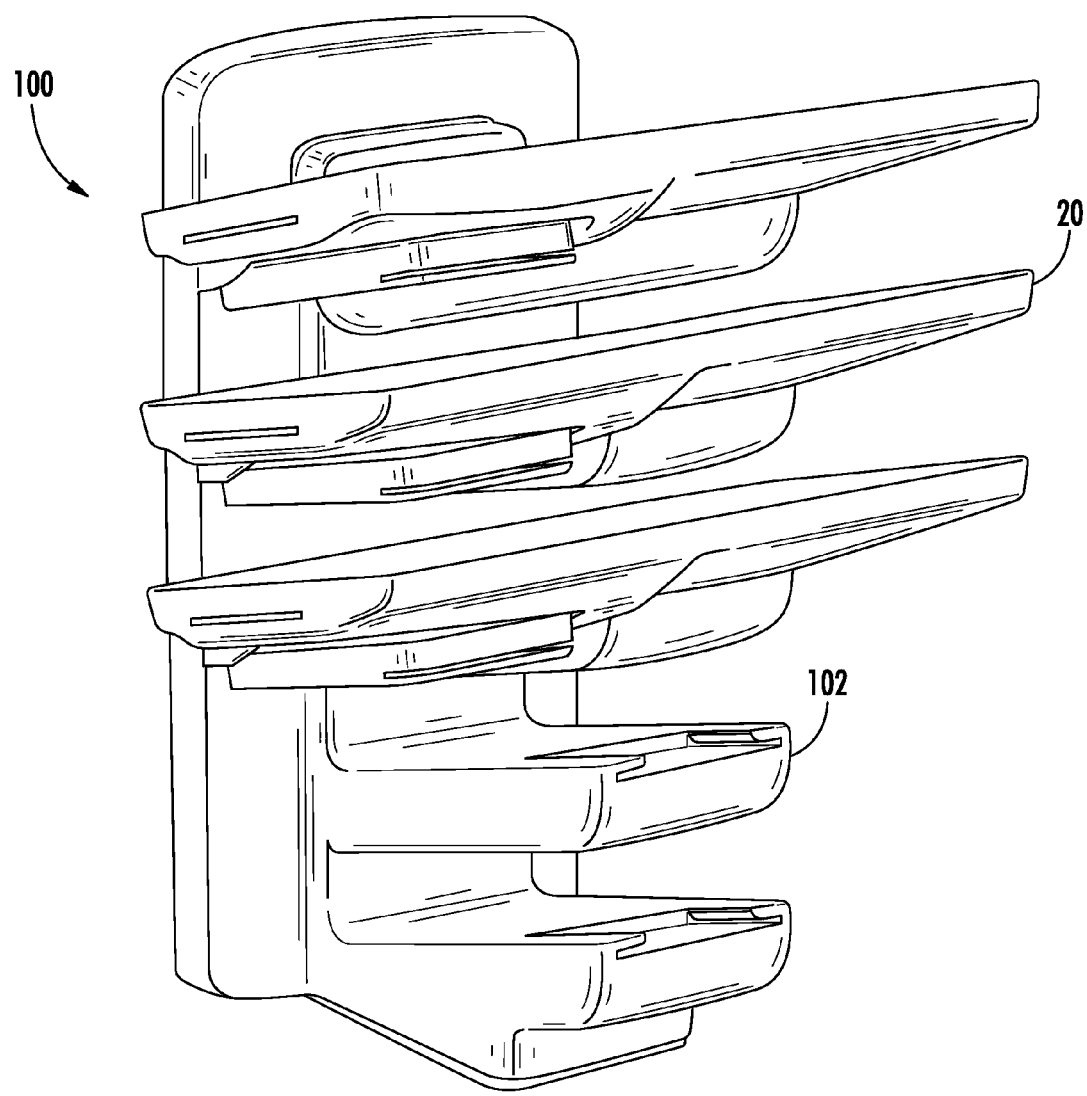
FIG. 11 illustrates a gang charger according to one embodiment.

In some embodiments, the anti-theft device 10 may further include a "gang charger" 100 configured to receive a plurality of portable electronic devices 15. As shown in FIG. 11, the gang charger 100 may include a plurality of shelves 102 for receiving and supporting a corresponding number of shrouds 20 and portable electronic devices 15. The gang charger 100 may be configured to provide power to the portable electronic devices 15. In some cases, the gang charger 100 may include an engagement member 156 (see FIG. 13) similar to the dock 50 for engaging and electrically connecting to the shroud 20. For example, each shelf 102 may include a dovetail engagement member 156 for engaging a similar dovetail hub member 22 on the shroud 20. The gang charger 100 may be configured to be mounted to a horizontal support surface or a vertical support surface, and may be self-supported in some cases. Moreover, the shelves 102 may have various configurations, such as vertically arranged shelves 102, and may be disposed at an angle relative to horizontal (e.g., less than about 20 degrees) for facilitating insertion and supporting of the shroud 20 and portable electronic device 15 on the shelf 102.

Figure 13:
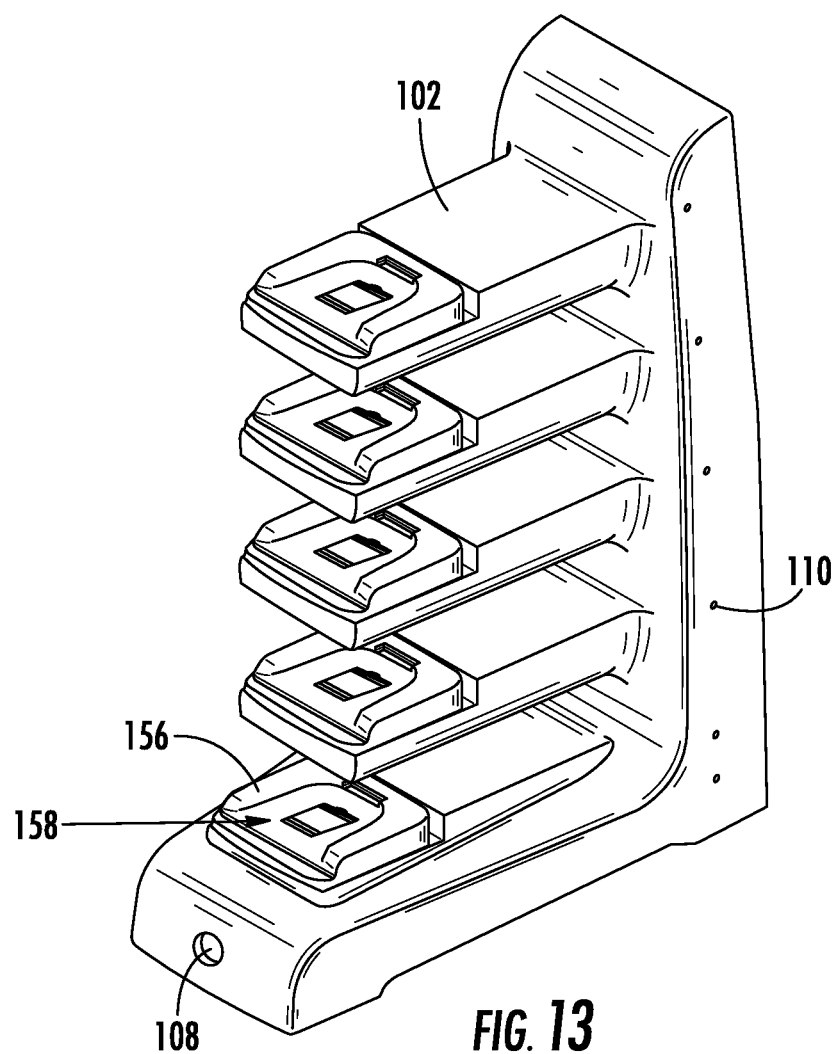
FIG. 13 illustrates a gang charger according to one embodiment.

In one embodiment, the gang charger 100 also includes a lock mechanism 158 (see FIG. 13) for locking each of the shrouds 20 and portable electronic devices 15. The lock mechanism 158 may be similar to that used to lock individual shrouds 20 to a dock 50 as discussed above. For example, each shelf 102 may include a solenoid configured to be actuated for locking or unlocking the shroud 20 to the shelf 102. Each shelf 102 may include a respective lock mechanism 158 such that individual shrouds 20 may be locked and unlocked independently of one another. Alternatively, multiple shrouds 20 may be configured to be locked and unlocked using a single lock mechanism 158. In either case, unlocking the lock mechanism 158 allows the shroud 20 and portable electronic device 15 to be removed from the shelf 102. Moreover, where individual lock mechanisms 158 are employed, additional shrouds 20 may be added to or removed from the gang charger 100 without having to lock or unlock other shrouds 20 disposed within the gang charger 100. In some cases, inserting a shroud 20 into engagement with a shelf 102 results in the shroud 20 being automatically locked to the shelf 102. Each shroud 20 and respective shelf 102 may be operated in such a manner. In some embodiments, an authorized user could use an electronic key or other suitable security means (e.g. a pass code) to lock or unlock the lock mechanism 158. For example, FIG. 13 shows an embodiment where the gang charger 100 includes a transfer port 108 for communicating with a key for unlocking each of the shrouds 20. In other embodiments, a manual actuator may be employed at the location of the transfer port 108 for manually unlocking the lock mechanism 158. Sometimes the manual actuator and transfer port 108 may be both present, such as where a user desires to use one of the two different options. In one embodiment, the manual actuator is rendered inoperable once the transfer port 108 communicates with an electronic key. Thus, at that time, only an electronic key may be used to unlock the lock mechanism 158. The lock mechanism 158 may also be configured to automatically relock in the event that removal of a portable electronic device 15 is detected. For example, when the lock mechanism 158 is unlocked and a shroud 20/portable electronic device 15 are removed, the lock mechanism 158 automatically relocks upon removal. Thus, additional shrouds 20/portable electronic devices 15 cannot be removed without again unlocking the lock mechanism 158. In some embodiments, the lock mechanism 158 may be configured to relock after a predetermined period of time after unlocking (e.g., less than about 10 seconds).

Figure 12:
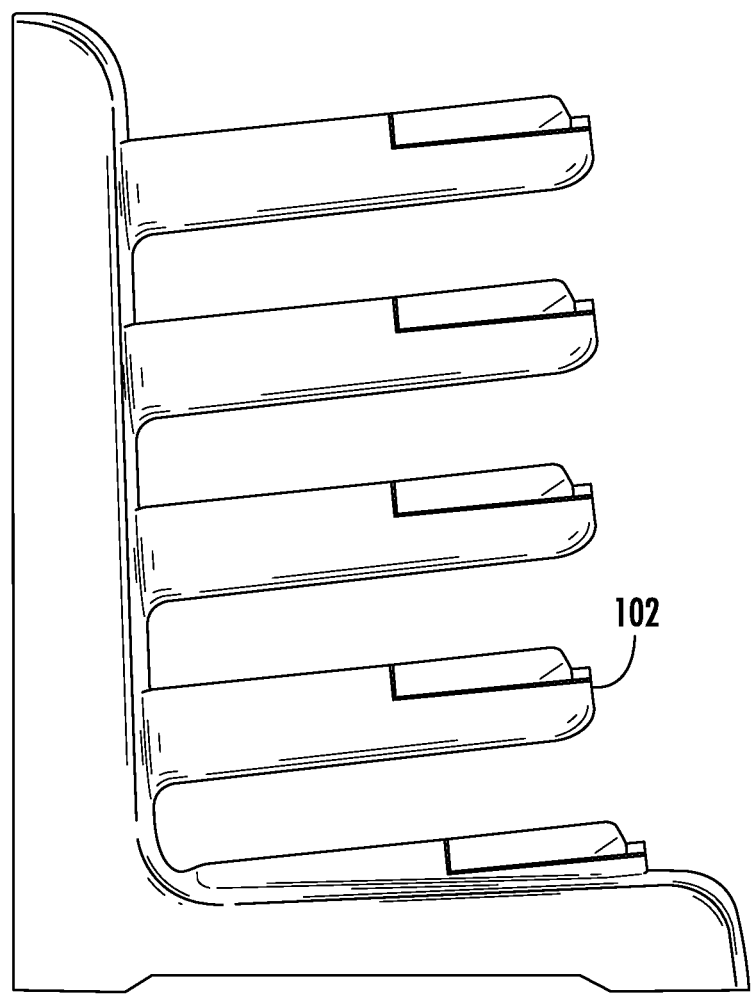
FIG. 12 illustrates a side view of the gang charger of FIG. 11.

Power may be provided to the portable electronic devices 15 docked within the gang charger 100 using a variety of techniques. In some cases, power is cycled to simplify the system and reduce the amount of heat generated in the gang charger 100. The gang charger 100 may be configured to provide power to portable electronic devices 15 having different voltage requirements (e.g., 5V and 12V). In one embodiment, the gang charger 100 may include one or more voltage regulators. A plurality of voltage regulators may be used for regulating power to one or more portable electronic devices 15, as well as an EMV reader 45 when present. For example, in the embodiment shown in FIGS. 12-13, five shelves 102 are provided, and three voltage regulators may be provided, wherein two of the regulators are each paired with two shelves 102, and the third regulator is paired with one shelf 102 and any EMV readers 45 when present. The gang charger 100 may be configured to acquire identifying information and/or voltage requirements from the shroud 20 to determine the amount of voltage to deliver to the portable electronic device. Moreover, the gang charger 100 may include one or more LEDs or visual indicators 110 for indicating the status of any portable electronic devices 15, such as that the portable electronic device 15 is docked, charging, and/or is fully charged.

In further embodiments, the gang charger 100 may be configured to provide auditing information. For instance, the gang charger 100 may be configured to store various types of information, such as the date and time that a lock mechanism 158 is locked and/or unlocked, a date and time that a tablet is returned to a shelf 102, the number of unlocking and/or locking events, an identifier for each tablet and/or shroud 20 that is removed or inserted, and/or an identifier for a key that unlocks the lock mechanism 158. Thus, specific information regarding a shroud 20 and/or tablet may be gathered. The information may be stored in a memory which may be located at any desired location, including in the lock mechanism 158. The stored information may be transferred to a key upon communication with the gang charger 100 and/or a remote location or device for reviewing the information. For example, the gang charger 100 may have wireless communications circuitry for communicating the information to a remote computing device. Auditing may allow for chain of custody controls and accountability by users of the tablets. The dock 50 may be configured to temporarily store data prior to transmitting the data to a remote location or device for review of the data.

In some embodiments, a plurality of gang chargers 100 may be employed, such as within a retail store. In some cases, each shroud 20 is configured to be docked to any one of the gang chargers 100. Where auditing is enabled, the gang chargers 100 may be connected via a network such that data may be gathered when a shroud 20 is docked on any one of the gang chargers 100. As such, useful data may be provided regardless of which gang charger 100 is used.

In one embodiment, the tablet and the dock 50 are configured to communicate with one another. For example, the dock 50 may be configured to request various information from the tablet while the shroud 20 is docked on the dock 50. The dock 50 could request information regarding the identification of the tablet, the battery life of the tablet, etc. Moreover, the dock 50 may be configured to gather other information, such as the time of docking or undocking of the shroud 20 on the dock 50, as well as an identifier for a key that is used to unlock a shroud 20 from a stand. The dock 50 may be configured to store the data and/or communicate the data to a remote location or device.

In some embodiments, the shroud 20 may include a sensor 26 (see FIG. 6). The sensor 26 may be configured to detect when the sensor is in proximity to a particular location, such as for example, an ingress/egress location or exit in a retail store. The sensor 26 may be configured to wirelessly communicate with one or more monitoring or base stations 70, such as via ultra-wideband ("UWB") or received signal strength indicator ("RSSI") communications. In addition, one or more sensors 26 may be configured to communicate with a monitoring or base station 70. Thus, in addition or as an alternative, the sensor 26 may be configured to be detected for initiating a security signal when detected by the monitoring or base station 70, such as an EAS tower or gate. The security signal may be generated by the monitoring or base station 70 at any desired location. In one case, the monitoring or base station 70 may be located near or at an exit of the retail store, and may be configured to communicate with the sensor 26 and determine that the sensor 26 is within the predetermined distance or range. Distance could be determined using any one or combination of techniques, such as via signal strength between the monitoring component and the sensor. If the monitoring or base station 70 determines that the sensor 70 is within the predetermined distance or range, the sensor and/or the monitoring or base station 70 may be configured to generate a security signal. Therefore, only when the sensor 26 is moved close to the monitoring or base station 70 will a security event result. In the case where the sensor 26 alarms when moved within the predetermined distance or range of the monitoring or base station 70, retail associates are alerted to a potential theft and can readily identify the merchandise attached to the sensor 26. In one example, the sensor 26 and/or monitoring or base station 70 may be configured to cease generating a security signal when the sensor 26 is moved from within the predetermined distance or range to outside the predetermined distance or range. In some embodiments, the sensor 26 and monitoring or base station 70 may be similar to that disclosed in U.S. Provisional Application No. 62/072,233, filed on Oct. 28, 2014, and U.S. Provisional Application No. 62/184,686, filed on Jun. 25, 2015, the entire disclosures of which are incorporated herein by reference in their entireties.

In one embodiment, the dock 50 is configured to provide a "seed code" to the shroud 20 and/or hub member 22 so that a shroud 20 and/or hub member 22 is able to determine which system it is part of by virtue of ever having been docked on a dock 50 that had been previously communicated with by a coded key. For example, each seed code may be associated with a particular retail store or establishment. Thus, the seed code may be used for association with the shroud 20 and/or hub member 22 in order to communicate with any dock 50 on which it is placed.

In another embodiment, the system may be configured to locate a shroud 20 and/or hub member 22 that a user believes is lost or missing. A dock 50 or monitoring or base station 70 may be configured to carry out a request, known as a roll call request. Such a roll call request may occur when a key communicates with the dock 50 or monitoring or base station 70 and instructs the same to go into a roll call request mode. The dock 50 or monitoring or base station 70 may be configured to send out simultaneous requests via wireless communication (e.g., UWB) to each shroud 20 and/or hub member 22 containing the same matching seed code and asks for a report back. If a shroud 20 is not docked on a dock 50 or gang charger 100, then the hub member 22 may be configured to generate an audible and/or visible signal for notifying the user. The user may activate communication from the hub member 22 (e.g., by pressing and holding a button on the hub member 22 for a predetermined period of time), such that the hub member 22 is configured to report back to the dock 50 or monitoring or base station 70 that it is accounted for (i.e., a user is using it and it is not lost). If a shroud 20 is already on a dock 50 or gang charger 100, then the hub member 22 may be configured to automatically report back to the monitoring or base station 70 that it is secure and therefore not lost.

After a predetermine period of time for the monitoring or base station 70 waiting for "roll call request" responses (e.g., either human or machine), any shroud 20 that has not reported back, may be sent a command to generate a louder, more frequent alarming signal so that an associate can follow the sound trail to locate the missing shroud 20 and tablet. Once located, the user may press and hold a button on the shroud 20 and/or hub member 22 to indicate back to the monitoring or base station 70 that it has been found via wireless communication. Alternatively, docking the shroud 20 on a dock 50 or gang charger 100 may also report back a "found" message to the monitoring or base station 70.

In some embodiments, the hub member 22 may be configured to determine its own battery life and at some level prior to full discharge, the hub member 22 may send a message to the monitoring or base station 70. The monitoring or base station 70 may be configured to record the "last known distance" of the shroud 20 at time of power loss, such as via a time of flight calculation between the monitoring or base station 70 and the shroud 20. This distance value may be stored and communicated via various techniques, such as wirelessly to a server and/or sending a user/manager a text message with the distance value so that if the shroud 20 ultimately loses power before a user can invoke a "roll call request" mode, the user at least has knowledge of a distance away from the monitoring or base station 70 for initiating a search of its location.

In some cases, the hub member 22 may be configured to enter a "low power" mode once it has determined its remaining battery life. The hub member 22 may be configured to send a message to a user/manager at which point the user would know to go to the monitoring or base station 70 so that they could initiate a "roll call request" function described above. Since the hub member 22 is already in a "low power mode", which it had previously communicated to the monitoring or base station 70, the monitoring or base station 70 is now in a "waiting patiently" mode knowing that the particular hub member 22 may not immediately report back as it is configured to temporarily cycle between a "low power mode" and a "standard power mode" to determine whether the hub member 22 has received a "roll call request" from the monitoring or base station 70. Once the hub member 22 receives the "roll call request" from the monitoring or base station 70 during a "standard power" mode, the hub member 22 may be configured to immediately generate an alarm signal so that the user who requested the monitoring or base station 70 to perform this "roll call request" can begin to audibly locate the hub member 22 before fully losing power.

In one particular embodiment, the electronic key discussed above is similar to that disclosed in U.S. Pat. No. 7,737,845, entitled Programmable Key for a Security System for Protecting Merchandise, the entire disclosure of which is incorporated herein by reference. In some embodiments, the shroud 20, dock 50, and/or electronic key are similar to that disclosed in U.S. application Ser. No. 14/059,735, filed on Oct. 22, 2013 and entitled Display Stand for a Tablet Computer, and U.S. application Ser. No. 14/300,476, filed on Jun. 10, 2014 and entitled Anti-Theft Device for Portable Electronic Device, the entire disclosures of which are incorporated by reference herein.

The foregoing has described one or more embodiments of an anti-theft device for protecting a portable electronic device, for example, a tablet, from theft or unauthorized removal. Those of ordinary skill in the art will understand and appreciate that numerous variations and modifications of the invention may be made without departing from the spirit and scope of the invention. Accordingly, all such variations and modifications are intended to be encompassed by the appended claims.

That which is claimed is:

1. An anti-theft device for securing a portable electronic device from unauthorized removal or theft, the anti-theft device comprising:
   a shroud configured to at least partially receive and engage a portable electronic device;
   a mobile payment interface pivotably coupled to the shroud for moving between an open position and a closed position, the mobile payment interface configured to operably couple to a mobile payment device; and
   a dock configured to releasably engage the shroud, wherein the dock is configured to communicate power and/or data signals with the portable electronic device and the mobile payment device.

2. The anti-theft device of claim 1, wherein the shroud comprises a hub member configured to releasably engage the dock.

3. The anti-theft device of claim 2, wherein the hub member is releasably secured to the shroud.

4. The anti-theft device of claim 1, wherein the mobile payment interface is removably attached to the shroud.

5. The anti-theft device of claim 1, wherein the shroud comprises a recess for receiving the mobile payment device in a non-use position.

6. The anti-theft device of claim 1, wherein the portable electronic device comprises a tablet.

7. The anti-theft device of claim 1, wherein the shroud is configured to rotate relative to the base about three axes of rotation.

8. The anti-theft device of claim 1, wherein the mobile payment interface is attached to the shroud via a hinge.

9. The anti-theft device of claim 8, wherein the mobile payment interface is electrically coupled to the shroud via the hinge.

10. The anti-theft device of claim 9, wherein the hinge is configured to receive at least one electrical conductor extending between the mobile payment interface and the shroud.

11. The anti-theft device of claim 1, further comprising a holding mechanism configured to hold the mobile payment interface in an open position or a closed position during use without user intervention.

12. An anti-theft device for securing a portable electronic device from unauthorized removal or theft, the anti-theft device comprising:
   a shroud configured to at least partially receive and engage a portable electronic device;
   a mobile payment interface coupled to the shroud and configured to operably couple to a mobile payment device, wherein the mobile payment interface is attached to the shroud via a hinge; and
   a dock configured to releasably engage the shroud.

13. The anti-theft device of claim 12, wherein the mobile payment interface is electrically coupled to the shroud via the hinge.

14. The anti-theft device of claim 13, wherein the hinge is configured to receive at least one electrical conductor extending between the mobile payment interface and the shroud.

15. The anti-theft device of claim 12, wherein the mobile payment interface is pivotably coupled to the shroud.

16. The anti-theft device of claim 12, wherein the shroud comprises a first portion and a second portion that are configured to engage with one another for at least partially enclosing the portable electronic device.

17. The anti-theft device of claim 12, wherein the shroud is configured to be removably attached to the portable electronic device.

18. An anti-theft device for securing a portable electronic device from unauthorized removal or theft, the anti-theft device comprising:
   at least one adapter configured to releasably engage an input port on a portable electronic device;
   a shroud configured to at least partially receive and engage the portable electronic device for establishing electrical communication with the at least one adapter; and
   a dock configured to releasably engage the shroud, the dock being in electrical communication with the portable electronic device via the at least one adapter,
   wherein the at least one adapter and the shroud each comprises at least one electrical contact configured to mate with and engage one another when the portable electronic device is received within the shroud.

19. The anti-theft device of claim 18, wherein the shroud is configured to align with and engage the at least one adapter when the portable electronic device is received within the shroud.

20. The anti-theft device of claim 18, wherein no wire electrically connects the portable electronic device to the shroud.

21. The anti-theft device of claim 18, further comprising a plurality of adapters, each adapter configured to releasably engage a respective input port on the portable electronic device.

22. The anti-theft device of claim 1, further comprising at least one adapter configured to releasably engage an input port on a portable electronic device, wherein the shroud is configured to at least partially receive and engage the portable electronic device for establishing electrical communication with the at least one adapter, and wherein the dock is configured to be in electrical communication with the portable electronic device via the at least one adapter.

23. The anti-theft device of claim 1, wherein the shroud comprises a wireless communications interface configured to communicate and be paired with the portable electronic device.

24. An anti-theft device for securing a portable electronic device from unauthorized removal or theft, the anti-theft device comprising:
   a shroud configured to at least partially receive and engage a portable electronic device, the shroud comprising a wireless communications interface configured to communicate and be paired with the portable electronic device; and
   a dock configured to releasably engage the shroud, the dock configured to engage the shroud in a locked configuration so as to prevent removal of the shroud and the portable electronic device from the dock and to disengage the shroud in an unlocked configuration so as to allow the shroud and the portable electronic device to be removed from the dock.

25. The anti-theft device of claim 24, wherein the shroud comprises a hub member configured to releasably engage the dock.

26. The anti-theft device of claim 25, wherein the wireless communications interface is housed within the hub member.

27. The anti-theft device of claim 24, wherein the wireless communications interface is configured to communicate via Bluetooth or Bluetooth Low Energy.

28. A system for securing a plurality of portable electronic devices from unauthorized removal or theft, the system comprising:
- a plurality of portable electronic devices;
- a plurality of shrouds, each shroud configured to at least partially receive and engage one of the plurality of portable electronic devices, each shroud comprising a wireless communications interface configured to communicate and be paired with any one of the plurality of portable electronic devices; and
- a plurality of docks, each dock configured to releasably engage one of the plurality of shrouds, each dock configured to engage the shroud in a locked configuration so as to prevent removal of the shroud and associated portable electronic device from the dock and to disengage the shroud in an unlocked configuration so as to allow the shroud and the associated portable electronic device to be removed from the dock.

29. The system of claim 28, wherein each portable electronic device and shroud is configured to releasably engage any one of the plurality of docks.

30. The system of claim 28, further comprising a plurality of mobile payment devices, each mobile payment device configured to operably engage one of the plurality of shrouds.

31. A method for securing a portable electronic device from unauthorized removal or theft, the method comprising:
- positioning a portable electronic device within the shroud, the shroud comprising a wireless communications interface configured to communicate and be paired with the portable electronic device; and
- positioning the shroud and the portable electronic device on a dock such that the shroud and the portable electronic device are locked to the dock.

32. The method of claim 31, further comprising inputting a command at the portable electronic device to cause the wireless communications interface to instruct the dock to unlock the shroud from the dock.

33. An anti-theft device for securing a portable electronic device from unauthorized removal or theft, the anti-theft device comprising:
- a shroud configured to at least partially receive and engage a portable electronic device;
- a mobile payment interface pivotably coupled to the shroud for moving between an open position and a closed position, the mobile payment interface configured to operably couple to a mobile payment device; and
- a dock configured to releasably engage the shroud, wherein the dock is configured to communicate power and data signals with the portable electronic device and the mobile payment device.

34. The anti-theft device of claim 1, wherein the dock is configured to engage the shroud in a locked configuration so as to prevent removal of the shroud and the portable electronic device from the dock and to disengage the shroud in an unlocked configuration so as to allow the shroud and the portable electronic device to be removed from the dock.

35. The anti-theft device of claim 34, wherein the dock is configured to disengage the shroud in response to communication with an electronic key.

36. The anti-theft device of claim 34, wherein the dock is configured to disengage the shroud in response to receiving a command at the portable electronic device.

37. The anti-theft device of claim 1, wherein the mobile payment interface comprises one or more electrical contacts for electrically connecting to the mobile payment device.

38. An anti-theft device for securing a portable electronic device from unauthorized removal or theft, the anti-theft device comprising:
- a shroud configured to at least partially receive and engage a portable electronic device;
- a mobile payment interface coupled to the shroud and configured to operably couple to a mobile payment device; and
- a dock configured to releasably engage the shroud, wherein the dock is configured to communicate power and/or data signals with the portable electronic device and the mobile payment device.

39. The anti-theft device of claim 38, wherein the dock is configured to engage the shroud in a locked configuration so as to prevent removal of the shroud and the portable electronic device from the dock and to disengage the shroud in an unlocked configuration so as to allow the shroud and the portable electronic device to be removed from the dock.

40. The anti-theft device of claim 39, wherein the dock is configured to disengage the shroud in response to communication with an electronic key.

41. The anti-theft device of claim 39, wherein the dock is configured to disengage the shroud in response to receiving a command at the portable electronic device.

42. The anti-theft device of claim 38, wherein mobile payment interface is pivotably coupled to the shroud.

43. The anti-theft device of claim 38, wherein the shroud comprises a wireless communications interface configured to communicate and be paired with the portable electronic device.

44. The anti-theft device of claim 38, wherein the mobile payment interface comprises one or more electrical contacts for electrically connecting to the mobile payment device.

45. The anti-theft device of claim 38, wherein each of the shroud and the mobile payment interface comprises a printed circuit board electrically connected to one another.

46. The anti-theft device of claim 38, wherein the dock is configured to transfer power to both the shroud and the mobile payment interface when the shroud is engaged with the dock.

47. The anti-theft device of claim 38, wherein each of the shroud and the dock comprises an electrical connector configured to engage with one another when the shroud is engaged with the dock.

48. The anti-theft device of claim 38, wherein the shroud is configured to rotate relative to the base about three axes of rotation.

49. The anti-theft device of claim 38, wherein the dock is configured to transfer power to the portable electronic device and the mobile payment device when the shroud is engaged with the dock.

50. The anti-theft device of claim 38, wherein the dock is configured to communicate data with the portable electronic device and/or the mobile payment device when the shroud is engaged with the dock.

51. The anti-theft device of claim 38, wherein the dock comprises an alarm configured to be activated in response to unauthorized removal of the portable electronic device and/or the shroud from the dock.

52. The anti-theft device of claim 38, wherein the dock comprises an alarm configured to be activated in response to unauthorized removal of the dock from a support surface.

53. The anti-theft device of claim 38, wherein the shroud comprises a wireless communications interface for communicating with the portable electronic device.

* * * * *

UNITED STATES PATENT AND TRADEMARK OFFICE
CERTIFICATE OF CORRECTION

PATENT NO. : 9,845,912 B2  
APPLICATION NO. : 15/510929  
DATED : December 19, 2017  
INVENTOR(S) : Jonathan D. Phillips et al.

Page 1 of 1

It is certified that error appears in the above-identified patent and that said Letters Patent is hereby corrected as shown below:

In the Claims

Please delete the word "base" and replace it with the word "dock" on Column 17, Line 32.

Please delete the word "the" and replace it with the word "a" on Column 19, Line 28.

Please delete the word "base" and replace it with the word "dock" on Column 20, Line 46.

Signed and Sealed this  
Sixth Day of February, 2018

Joseph Matal  
*Performing the Functions and Duties of the  
Under Secretary of Commerce for Intellectual Property and  
Director of the United States Patent and Trademark Office*